United States Patent
Beutler

(10) Patent No.: US 10,352,735 B2
(45) Date of Patent: Jul. 16, 2019

(54) MAGNETOSTRICTIVE PATH-MEASURING DEVICE HAVING A PLURALITY OF MEASURING SECTIONS AND A TIME CONTROL DEVICE, AND METHOD FOR OPERATING SUCH A MAGNETOSTRICTIVE PATH-MEASURING DEVICE

(71) Applicant: BALLUFF GmbH, Neuhausen (DE)

(72) Inventor: Torsten Beutler, Ostfildern (DE)

(73) Assignee: BALLUFF GmbH, Neuhausen (DE)

( * ) Notice: Subject to any disclaimer, the term of this patent is extended or adjusted under 35 U.S.C. 154(b) by 84 days.

(21) Appl. No.: 15/695,076

(22) Filed: Sep. 5, 2017

(65) Prior Publication Data

US 2018/0128655 A1    May 10, 2018

Related U.S. Application Data

(63) Continuation of application No. PCT/EP2015/054852, filed on Mar. 9, 2015.

(51) Int. Cl.
    *G01D 5/48*    (2006.01)
(52) U.S. Cl.
    CPC .................. *G01D 5/485* (2013.01)
(58) Field of Classification Search
    CPC ..................................... G01D 5/485
    USPC ................................... 324/207.13
    See application file for complete search history.

(56) References Cited

U.S. PATENT DOCUMENTS

| | | | |
|---|---|---|---|
| 4,121,155 A | 10/1978 | Chamuel | |
| 4,634,973 A * | 1/1987 | Murakami | G01D 5/247 178/18.04 |
| 5,050,430 A * | 9/1991 | Begin | G01B 7/003 324/207.13 |
| 5,747,986 A | 5/1998 | Hristoforou | |
| 6,185,155 B1 | 2/2001 | Steinich | |
| 6,559,636 B1 | 5/2003 | Brunsch et al. | |
| 7,965,073 B2 | 6/2011 | Steinich | |
| 9,182,213 B2 | 11/2015 | Zern et al. | |
| 2001/0017539 A1 | 8/2001 | Brunsch et al. | |

(Continued)

FOREIGN PATENT DOCUMENTS

CN    101788259    7/2010
DE    19753805    6/1999

(Continued)

*Primary Examiner* — Jay Patidar
(74) *Attorney, Agent, or Firm* — Lipsitz & McAllister, LLC

(57) ABSTRACT

A magnetostrictive path-measuring device is provided, comprising a plurality of measuring sections, each having an extent in a longitudinal direction and being arranged parallel to one another at least in a measuring region, at least one magnetic position indicator which is coupled contactlessly to the measuring sections, a start signal application device by means of which start signals are providable to the measuring sections for the generation of excitation current pulses, and an evaluating device by means of which the position of the position indicator on the measuring sections is determinable by a transit time measurement of mechanical waves, wherein the start signal application device comprises a time control device which directs that in a measuring cycle, start signals are provided to different measuring sections at defined different time points.

24 Claims, 17 Drawing Sheets

(56) References Cited

U.S. PATENT DOCUMENTS

| | | |
|---|---|---|
| 2005/0132807 A1 | 6/2005 | Steinich |
| 2008/0150520 A1 | 6/2008 | Steinich |
| 2013/0181700 A1 | 7/2013 | Zern et al. |

FOREIGN PATENT DOCUMENTS

| | | |
|---|---|---|
| DE | 10201880 | 7/2003 |
| DE | 102004062968 | 7/2006 |
| DE | 102005039661 | 3/2007 |
| DE | 102013009221 | 12/2014 |
| EP | 1306650 | 5/2003 |
| WO | 2012019927 | 2/2012 |
| WO | 2016128021 | 8/2016 |

* cited by examiner

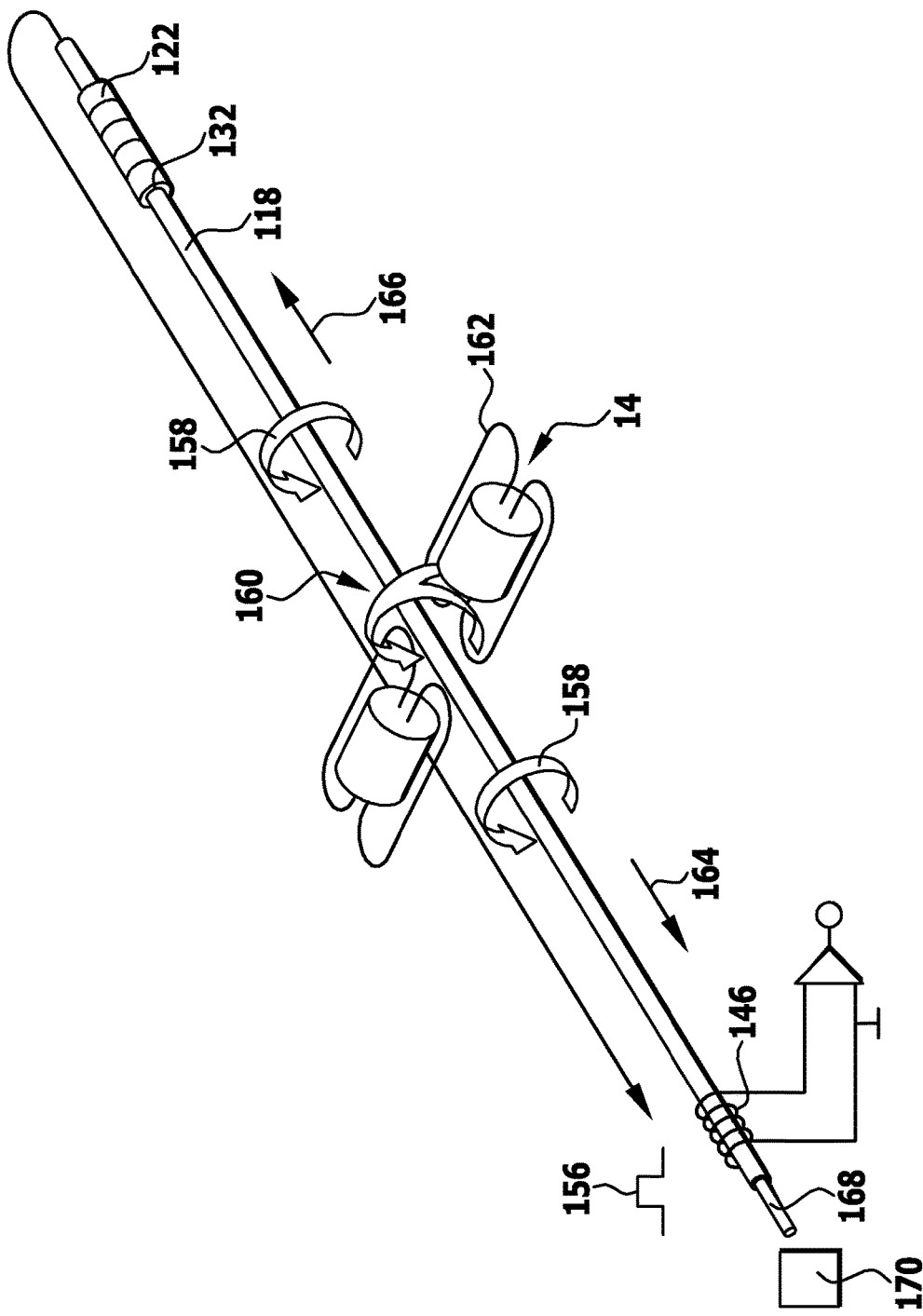

MAGNETOSTRICTIVE PATH-MEASURING DEVICE HAVING A PLURALITY OF MEASURING SECTIONS AND A TIME CONTROL DEVICE, AND METHOD FOR OPERATING SUCH A MAGNETOSTRICTIVE PATH-MEASURING DEVICE

This application is a continuation of international application No. PCT/EP2015/054852 filed on Mar. 9, 2015 which is incorporated herein by reference in its entirety and for all purposes.

BACKGROUND OF THE INVENTION

The invention relates to a magnetostrictive path-measuring device, comprising a plurality of measuring sections, each having an extent in a longitudinal direction and being arranged parallel to one another at least in a measuring region, at least one magnetic position indicator which is coupled contactlessly to the measuring sections, a start signal application device by means of which start signals are providable to the measuring sections for the generation of excitation current pulses, and an evaluating device by means of which the position of the position indicator on the measuring sections is determinable by a transit time measurement of mechanical waves.

The invention further relates to a method for operating a magnetostrictive path-measuring device, wherein the path-measuring device comprises a plurality of measuring sections, each having an extent in a longitudinal direction and being arranged parallel to one another at least in a measuring region, and a magnetic position indicator which is coupled contactlessly to the measuring sections, wherein start signals are provided to the measuring sections, initiating excitation current pulses on the measuring sections and wherein a transit time of mechanical waves on the measuring sections is determined.

From WO 2012/019927 A1 or US 2013/0181700 A1, there is known a path-measuring device, comprising at least one first measuring section and one second measuring section which each have an extent in a longitudinal direction and at least in a measuring region are oriented parallel to one another, at least one position indicator which is coupled contactlessly to the measuring sections and a measuring section holder which extends in the measuring region and has recesses in each of which a measuring section is arranged.

From EP 1 306 650 A1, there is known a displacement sensor device for the acquisition of the displacement of a position indicator, which comprises a measuring sensor extending in a longitudinal direction, to which the position indicator is coupled contactlessly.

If a plurality of (at least two) measuring sections, that is, at least two measuring sensors are provided, then a redundant path measurement or position determination can be achieved. A corresponding path-measuring device can be used in an advantageous manner, for example, for safety-related uses.

From DE 10 2004 062 968 A1, there is known a path-measuring device with a housing in the form of an intrinsically stable hollow, peripherally closed profile sealable at its ends, with a cross-sectional contour remaining constant in the longitudinal direction, a waveguide unit in the interior of the profile, wherein the waveguide of the waveguide unit extends in the longitudinal direction of the profile, an evaluating electronics unit and a magnet which is movable externally in the longitudinal direction along the profile as the position indicator. The profile has a stepless inner contour over the entire length and, arranged in the inner contour, is at least one insert with an inner contour rotationally fixed in the rotation direction about the longitudinal axis, which also has any desired internal corners, external corners and/or steps.

From US 2001/0017539 A1, there is known a modular waveguide arrangement.

From CN 101788259, there is known a magnetostrictive displacement sensor which comprises two sets of signal generating devices. Each set comprises a waveguide wire.

From DE 197 53 805 A1, there is known a mounting for waveguides which serves for the propagation of mechanical waves, wherein the mounting has a high proportion of gas and a low proportion of solid material.

From U.S. Pat. No. 4,121,155, there is known a position-determining system.

SUMMARY OF THE INVENTION

In accordance with an embodiment of the invention, a path-measuring device is provided which enables an improved signal quality and/or a more rapid sampling and/or a shortening of dead times.

In accordance with an embodiment of the invention, the start signal application device comprises a time control device which directs that in a measuring cycle, start signals are provided to different measuring sections (paths, trades) at defined different time points.

By means of the time control device, it is possible to set that start signals are not provided simultaneously to the different measuring sections of the plurality of measuring sections (that is, the at least two measuring sections), but with a temporal offset.

By means of this temporal offset, it can be achieved that, for example, with a constant measuring length, a signal quality is improved or that with a constant signal quality, a faster sampling is achieved, or that with the same sampling and the same signal quality, dead stretches are shortened. The aforementioned comparison is herein related to only one measuring section being used or, given a plurality of measuring sections, the start signals being provided simultaneously to different measuring sections.

By means of the inventive solution, it is possible without a sampling rate for an individual measuring section being increased, to achieve a faster clocking rate for the overall system with the plurality of measuring sections. The temporal offset of the start signals for different measuring sections causes an effective increase in the clocking rate.

It is provided, in particular, that the time control device directs that in one measuring cycle, a start signal is provided to a first measuring section at a first time point and at a second time point which lies at a first time interval from the first time point, a start signal is provided and a respective start signal is provided to a further measuring section between the first time point and the second time point. Thereby, a non-simultaneous start signal application to the measuring sections takes place. The corresponding temporal offset in different measuring sections can be used to achieve a faster clocking rate for the overall system or a better signal quality (without detriment to the clocking rate) or can be used to shorten dead zones.

In particular, it is provided that with n measuring sections, where n is an integer, the time control device directs that in a measuring cycle a start signal is provided to a measuring section i, where i=2, . . . , n at a second time interval $(i-1)/n \cdot \Delta T$ relative to the first time point. Thus, by simple means, a faster clocking rate can be achieved for the overall system than for a single measuring section or a better signal quality can be achieved or dead zones can be shortened.

In particular, start signals are provided to each measuring section respectively at the first time interval. Thereby, measuring cycles can be run through at an individual measuring section.

In one exemplary embodiment, it is provided that the first time interval is equal to or greater than a maximum transit time of a mechanical wave on a measuring section. It can thereby be ensured that reflections are so far decayed that a good signal quality is achieved.

In one exemplary embodiment, it is provided that the first time interval is equal to or greater than twice a maximum transit time of a mechanical wave on a measuring section. It can thereby be ensured that on a corresponding measuring section, no reflections are still in progress and a signal quality is enhanced. This can be used to shorten a dead zone at the end of a measuring section since a corresponding damping can be shortened in order to achieve a sufficient signal quality. In effect, less effort must be expended for the damping, since a longer wait is undertaken.

It can herein be provided that time intervals at which start signals are provided to the measuring sections in a measuring cycle are fixedly set and, in particular, are established dependent upon a measuring length and a propagation velocity of the mechanical wave. Thereby, a corresponding time control can be achieved with simple means.

It is also possible that time intervals at which start signals are provided to the measuring sections in a measuring cycle are determined by detecting reflections of the mechanical wave. In particular, it is then tested whether reflections undershoot a particular threshold (for example an amplitude threshold) and then a start signal is initiated accordingly at a temporal interval if this threshold value is undershot.

A measuring cycle begins with the first time point and ends with the time point which has the first time interval from that time point at which of all the measuring sections the temporally last start signal is provided to a corresponding measuring section between the first time point and the second time point. It is herein possible in principle that measuring cycles are interleaved, that is that, for example, a new measuring cycle starts before a previous measuring cycle is entirely completed.

It is favourable if the measuring sections are identically constructed. It can thereby be achieved that the position indicator couples identically to all the measuring sections in order accordingly, by the temporal control, to achieve a faster clocking rate and/or an improved signal quality and/or a capability of shortening dead zones. In one embodiment, a dedicated start signal generator of the start signal application device is associated with each measuring section.

It can also be provided that associated with a plurality of measuring sections is a common start signal generator, to which a multiplexer is connected downstream, wherein the multiplexer provides start signals to the respective measuring sections. By means of individual start signal generators or by means of a multiplexer, an individual temporal control of the start signal application to the measuring sections can be achieved.

It is favourable if the time control device is coupled to the evaluating device. Thereby, the evaluating device can allocate its prepared signals to the individual measuring sections in order to carry out an optimized evaluation.

For example, associated with the evaluating device is a multiplexer, by means of which signals which are provided by the measuring sections, are providable to the evaluating device.

In accordance with an embodiment of the invention in a measuring cycle, start signals are provided to different measuring sections at different times.

The in accordance with the invention method can be carried out, in particular, with the device in accordance with the invention or the method in accordance with the invention can be carried out on the device in accordance with the invention.

Advantageous implementations of the inventive method have also already been described in relation to the inventive device.

For example, in a measuring cycle, a start signal is provided to a first measuring section at a first time point and at a second time point which lies at a first time interval from the first time point, a start signal is provided and a respective start signal is provided to a further measuring section between the first time point and the second time point. A temporal offset is thereby achieved, by means of which a faster clocking rate and/or an improved signal quality and/or a capability of shortening dead zones can be achieved.

With n measuring sections, where n is an integer, in particular, a start signal is provided to a measuring section i, where i=2, ..., n at a second time interval $(i-1)/n \cdot \Delta T$ from the first time point. Thereby, for example, in relation to the overall system, a faster clocking rate can be realized than for individual measuring sections, with the corresponding advantages.

It is favourable if the first time interval is equal to or greater than a maximum transit time of a mechanical wave on a measuring section. By this means, for example, given the same accuracy, a position value can be obtained at more time points.

In one exemplary embodiment, it is provided that the first time interval is equal to or greater than twice a maximum transit time of a mechanical wave on a measuring section. It can thereby be ensured that absolutely no reflections are still in progress on the measuring section. Thereby, a better signal quality is achieved and/or a dead zone can be shortened.

For example, time intervals at which start signals are provided to the measuring sections in a measuring cycle are fixedly set and, in particular, are established dependent upon a measuring length and a propagation velocity of the mechanical wave. Thereby, time intervals are fixedly defined.

An active time interval determination can also be realized in that time intervals at which start signals are provided to the measuring sections in a measuring cycle are determined by detecting reflections of the mechanical wave. In particular, it is tested whether reflections which were in progress on the measuring section have exceeded a threshold value (for example, with regard to the amplitude).

A measuring cycle begins with the first time point and ends with the time point which has the first time interval from that time point at which of all the measuring sections the temporally last start signal is provided to a corresponding measuring section between the first time point and the second time point. Then, start signals have been provided to all the measuring sections and a new start signal is initiated, which means that a position measurement which was initiated by the primary start signals is completed. It is herein possible that measuring cycles are interleaved with one another such that at the start of a new measuring cycle (on a measuring section), a previous measuring cycle at another measuring section is not yet completed.

In particular, an effective clocking rate of the path-measuring system according to one measuring cycle is faster than a clocking rate on the measuring sections and, in particular, with n measuring sections wherein n is an integer, the clocking rate of the path-measuring system is n-times faster than on a single measuring section. If the effective clocking rate of the path-measuring system is adapted to conventional systems, then a higher signal quality can be achieved thereby and/or dead zones can be shortened. If a clocking rate on an individual measuring section is adapted to conventional systems, then a faster clocking rate can be achieved for the overall system and dead times are reduced.

The following description of preferred embodiments, in conjunction with the drawings, serves to explain the invention in greater detail. In the drawings:

BRIEF DESCRIPTION OF THE DRAWINGS

FIG. 12(a) shows a schematic representation of a waveguide in order to explain its functioning;

DETAILED DESCRIPTION OF THE INVENTION

Figure 1:
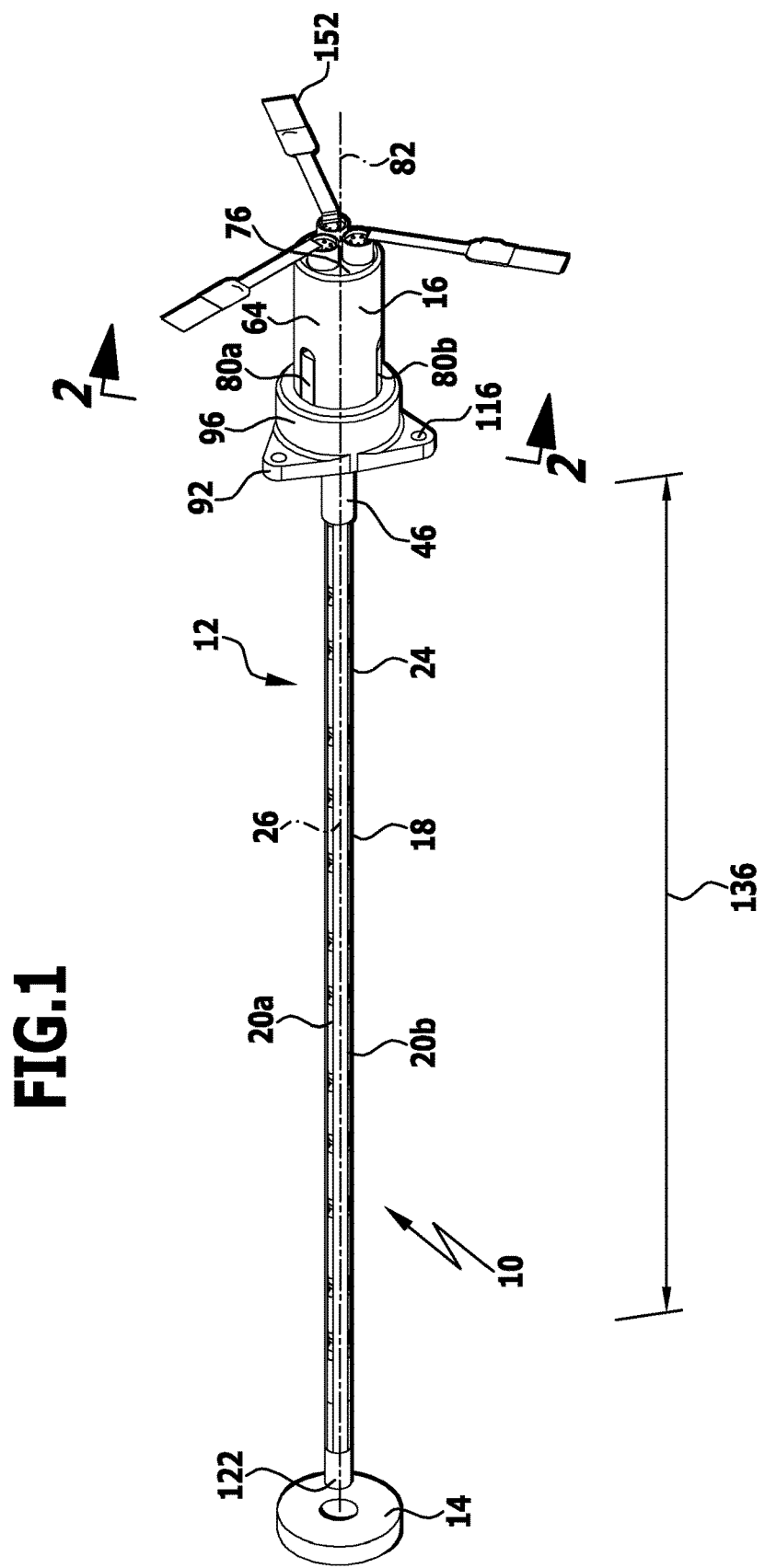
FIG. 1 shows a perspective view of an exemplary embodiment of a path-measuring device.

One exemplary embodiment of an inventive magnetostrictive path-measuring device which is shown in FIG. 1 and is identified there as 10 comprises a displacement transducer 12 and a magnetic position indicator 14. The displacement transducer 12 is configured as a magnetostrictive displacement transducer. The position indicator 14 is a magnet and, in particular, a permanent magnet, for example, in the form of an annular magnet.

The displacement transducer 12 comprises a measuring head 16. A travel path device 18 is held on the measuring head 16. The travel path device 18 herein has a plurality of parallel measuring sections (measuring paths or measuring trades) 20a, 20b, 20c (FIGS. 1, 5, 6, 8). In the exemplary embodiment shown, a first measuring section 20a, a second measuring section 20b and a third measuring section 20c are provided. In a measuring region, the measuring sections 20a, 20b, 20c are aligned parallel to one another and oriented with a linear extent. The position indicator 14 simultaneously couples to all the measuring sections 20a, 20b, 20c. In particular, the measuring sections 20a, 20b, 20c are configured identically and the coupling of the position indicator 14 is the same to all the measuring sections 20a, 20b, 20c.

Figure 3:
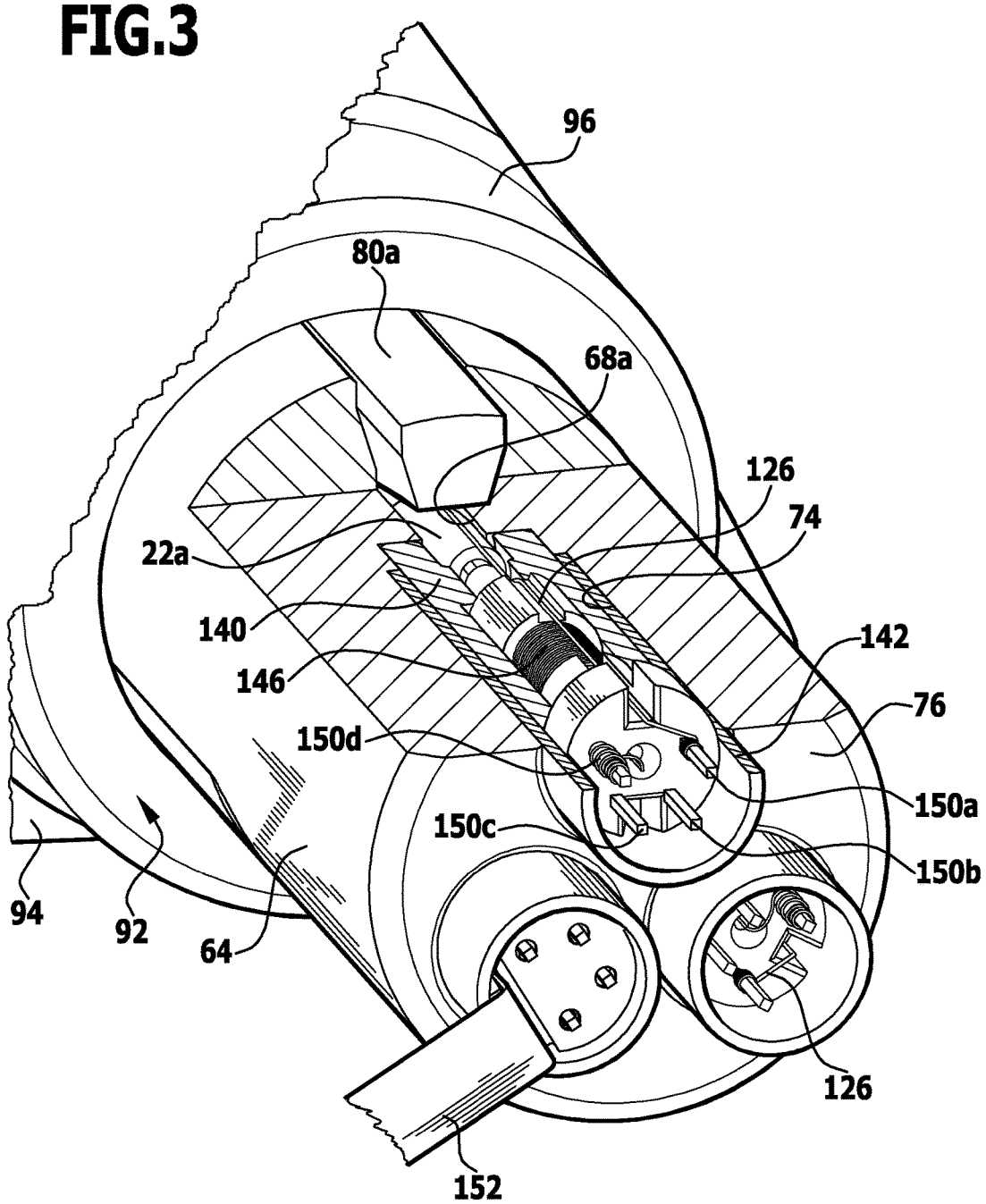
FIG. 3 shows a perspective partial sectional view of a measuring head region of the path-measuring device of FIG. 1.
Figure 4:
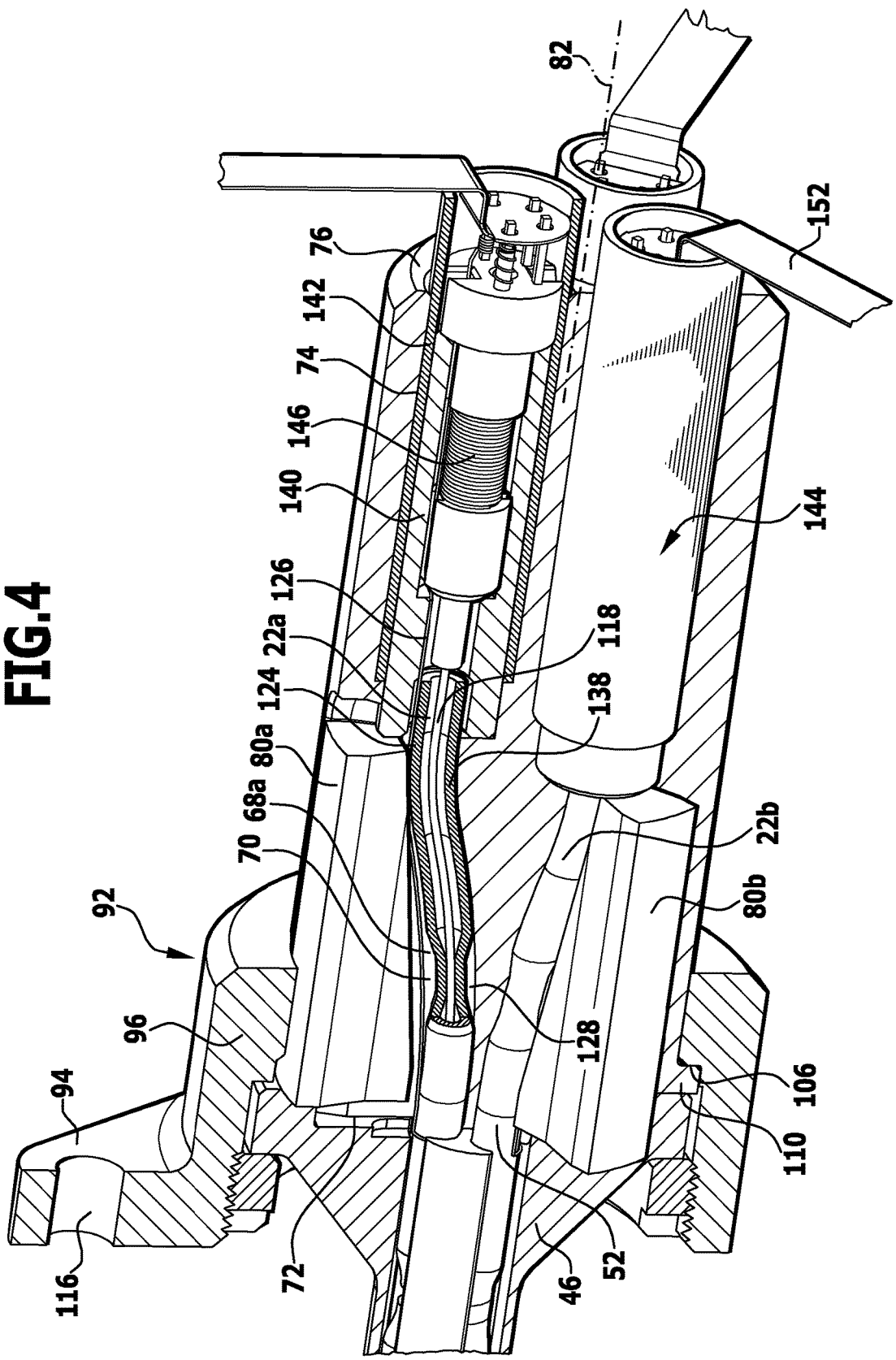
FIG. 4 shows a further perspective sectional view of a measuring head.
Figure 5:
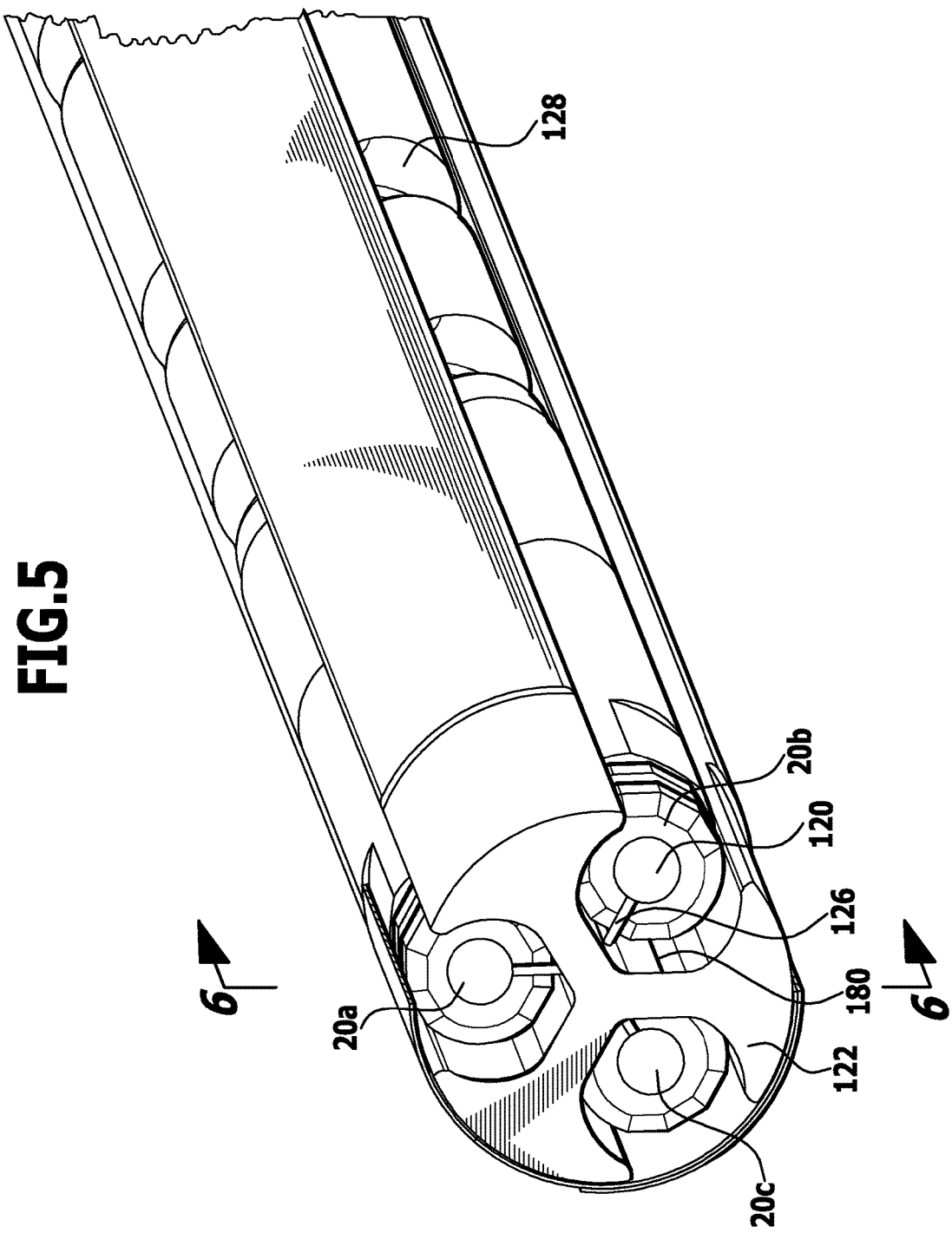
FIG. 5 shows a partial view of a measuring section holder.
Figure 6:
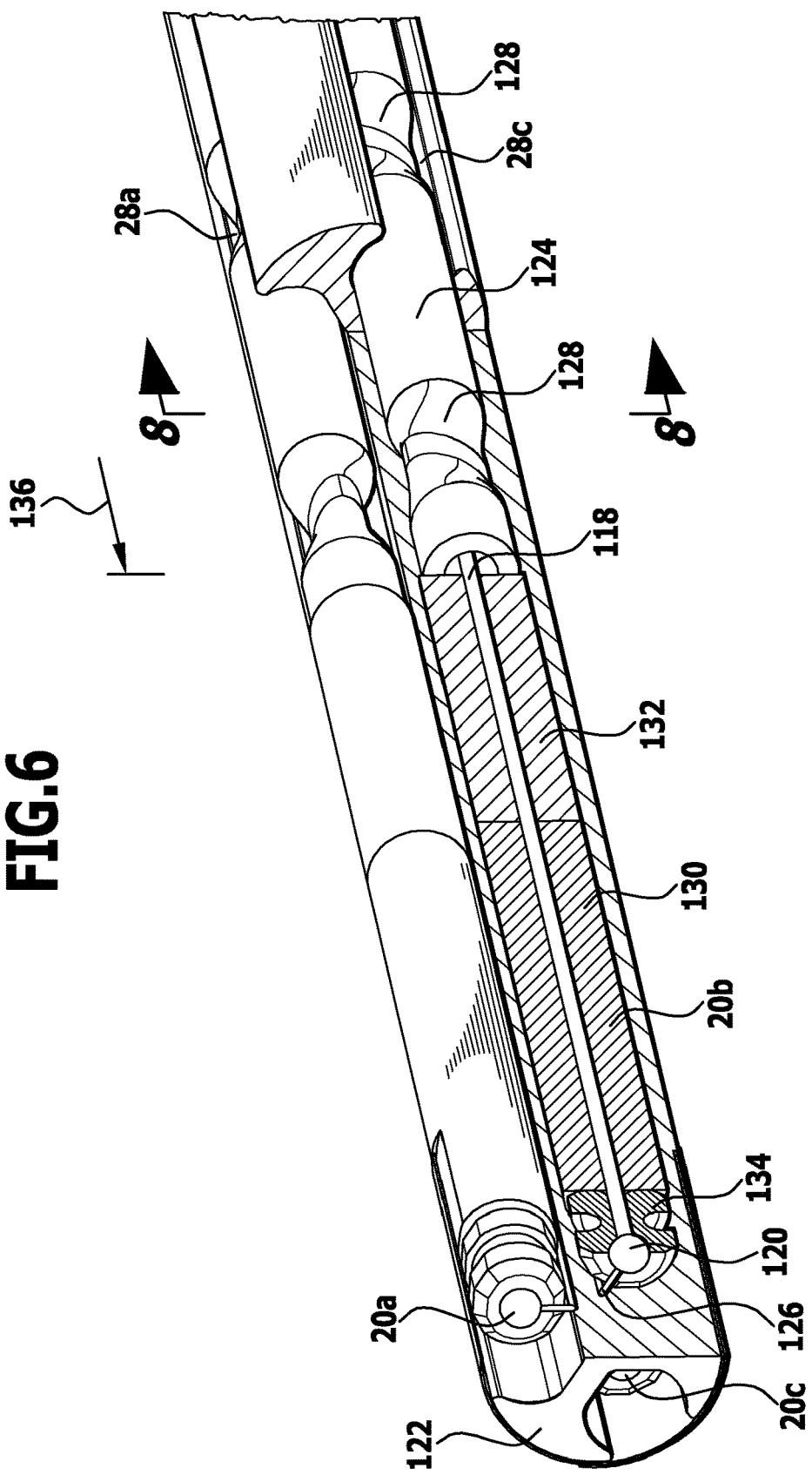
FIG. 6 shows a perspective sectional view along the line 6-6 of FIG. 5.

The measuring sections 20a, 20b, 20c are arranged on the travel path device 18. A respective measuring section continuation 22a, 22b, 22c which is positioned in the measuring head 16 is associated with each of the measuring sections 20a, 20b, 20c (FIGS. 3, 4).

The displacement transducer 12 comprises a measuring section holder 24. This extends in a longitudinal direction 26 along a corresponding axis. The measuring section holder 24 has a cylindrical external contour (FIGS. 5 to 8). It is arranged in a protective tube (not shown in the drawings).

The measuring section holder 24 extends over the entire length of the measuring sections 20a, 20b, 20c, wherein it has a greater length than these measuring sections, as described in greater detail below.

The measuring section holder 24 has a groove-shaped first recess 28a for the first measuring section 20a, a groove-shaped second recess 28b for the second measuring section 20b and a groove-shaped third recess 28c for the third measuring section 20c. The respective measuring sections 20a, 20b, 20c are arranged in these recesses 28a, 28b, 28c. The recesses 28a, 28b, 28c extend in the longitudinal direction 26 and are aligned parallel to one another and therein oriented parallel to the axis 26.

The measuring section holder 24 is made from a fibre-reinforced material and, in particular, fibre-reinforced plastics material. The fibres are preferably glass fibres. A fibre orientation is herein at least approximately parallel to the longitudinal direction 26. The measuring section holder 24 thereby has a low thermal expansion.

The measuring section holder 24 is produced, for example, by means of a pultrusion process. In one exemplary embodiment, a maximum thickness D (diameter) is not more than 10 mm (see FIGS. 7 and 8). In an actual exemplary embodiment, this thickness is approximately 6 mm.

Figure 7:
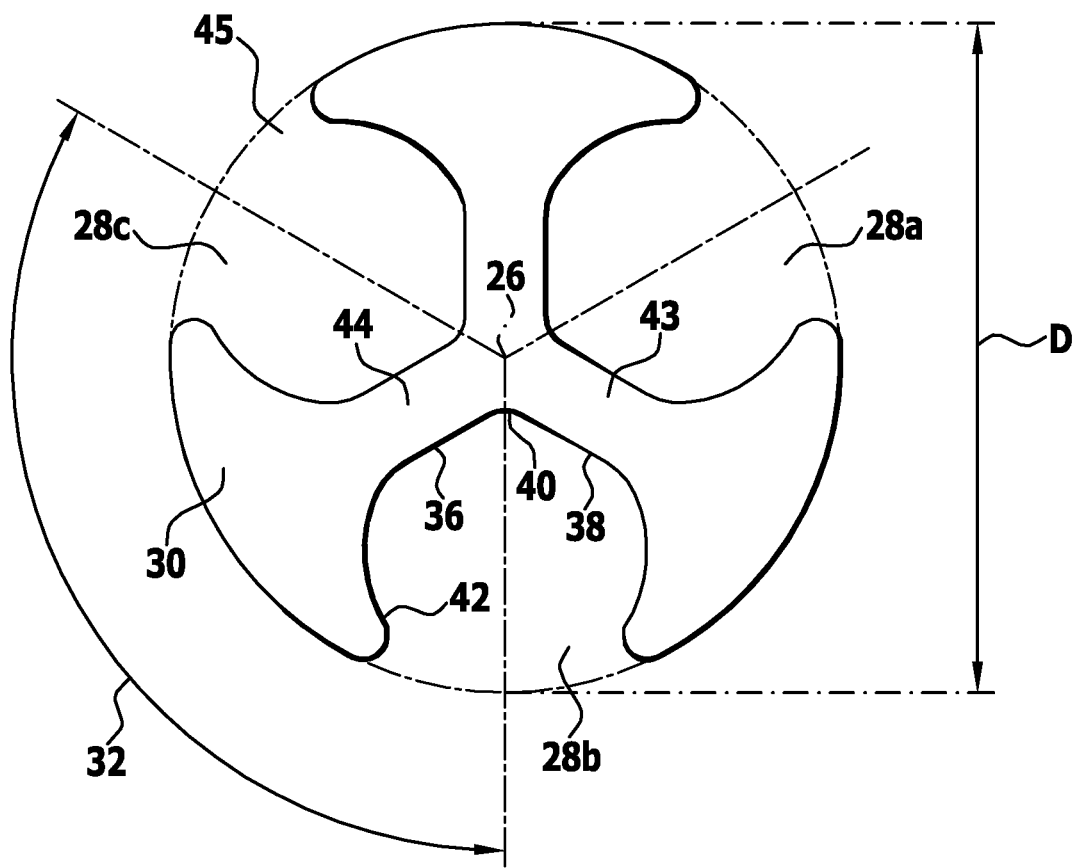
FIG. 7 shows a sectional view of a measuring section holder.
Figure 8:
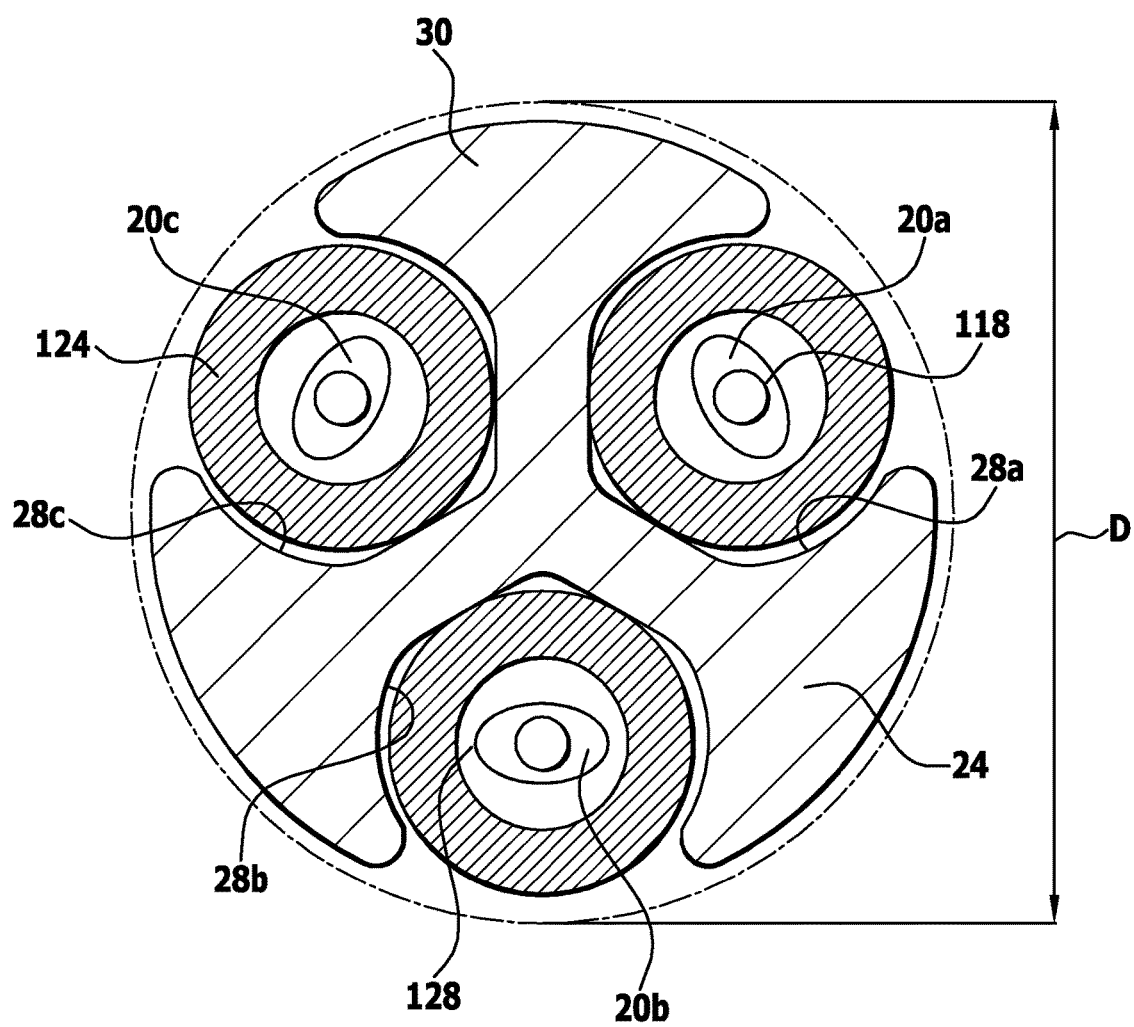
FIG. 8 shows a similar view to FIG. 7 with measuring sections arranged therein (according to a sectional view along the line 8-8 of FIG. 6)

The measuring section holder 24 has, in relation to its cross-section, mutually connected T-shaped elements 30 (FIGS. 7, 8). These T-shaped elements 30 are arranged in a star form. The T-shaped elements 30 and thus also the recesses 28a, 28b, 28c are arranged evenly distributed at an angle 32 of 120° rotationally symmetrically to the longitudinal direction 26. The T-shaped elements 30 are identically configured.

The respective recesses 28a etc. are separated by walls 34 which have an even wall thickness. The recesses 28a etc. are not configured circular. They have a first region 36 at which the adjoining walls 34 have an at least approximately planar side 38. Correspondingly planar sides 38 adjoin one another, wherein a rounding is present at the transition region 40.

The recesses 28a etc. also have a second region 42. Herein, the walls 34 are configured arcuate and, in particular, rounded.

In a central region 44 close to the axis 26, as mentioned above, the walls 34 have an even wall thickness.

The recesses 28a etc. have an opening 45 toward the outside parallel to the longitudinal direction 26. The recesses 28a etc. are thereby configured as grooves in the measuring section holder 24. The walls 34 herein surround the recess in an angular range of at least 220° and, for example, in an angular range of 270°. A measuring section 20a etc. arranged in the respective recess 28a etc. is thereby surrounded except for the opening 44 of wall material of the measuring section holder 24.

Figure 2:
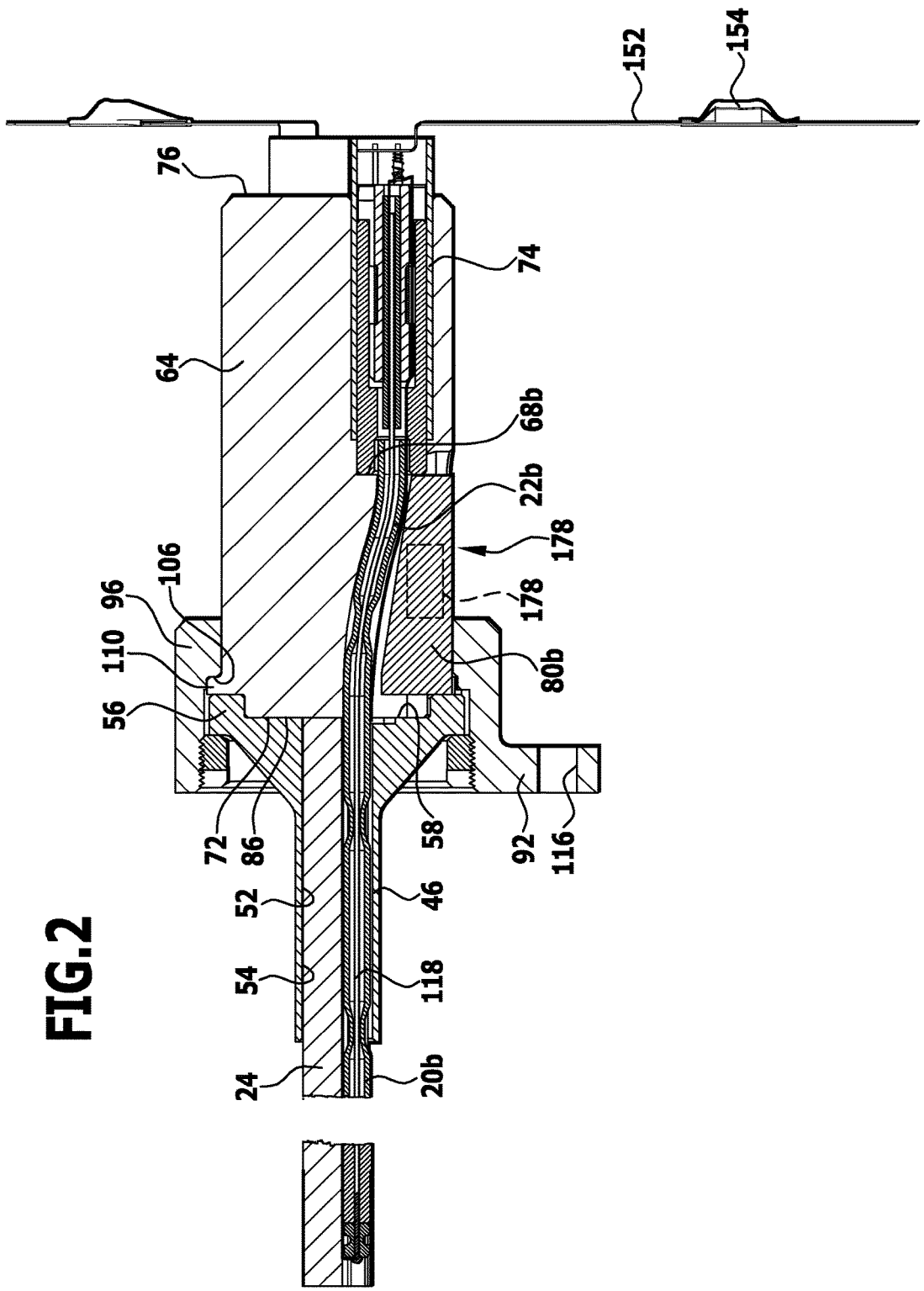
FIG. 2 shows a sectional view along the line 2-2 of FIG. 1.
Figure 9:
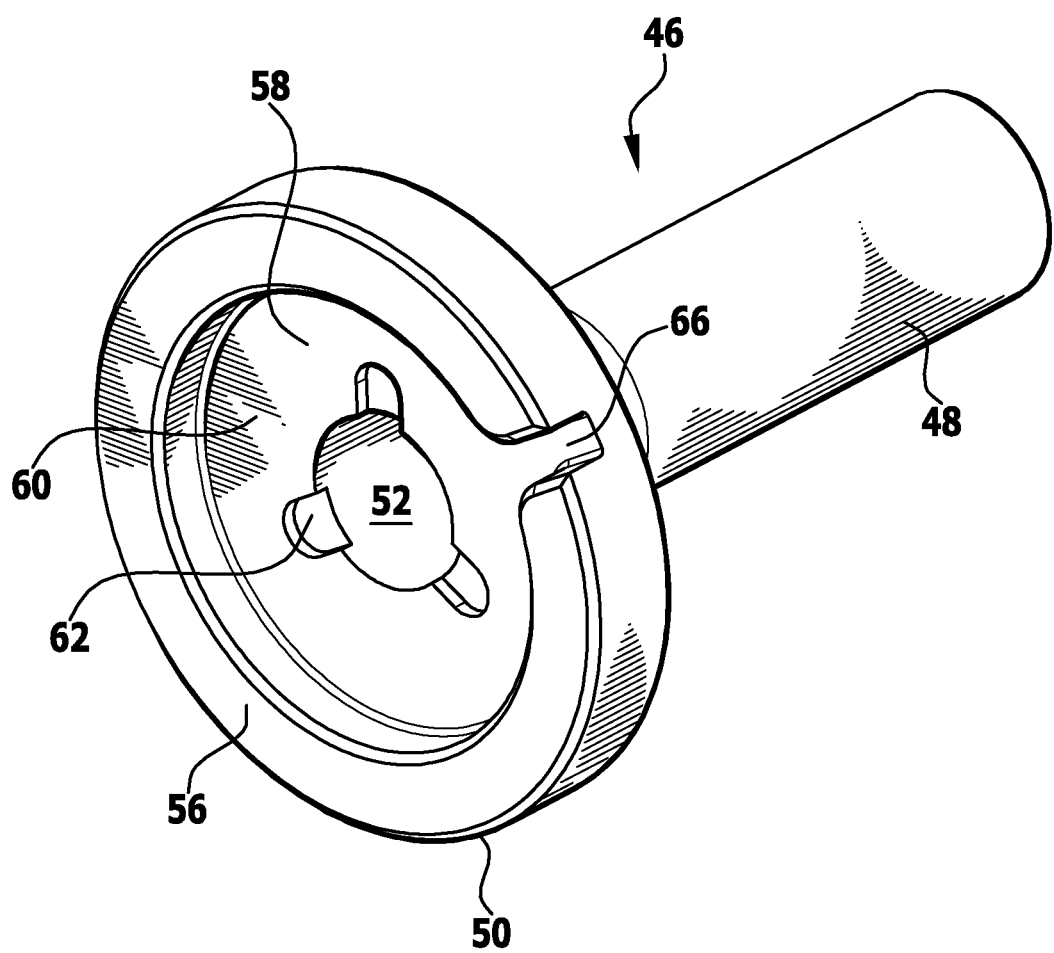
FIG. 9 shows a perspective view of an exemplary embodiment of a measuring section holder.

The measuring head 16 has a measuring section holder carrier 46 on which the measuring section holder 24 is held (FIGS. 1, 2, 9). This measuring section holder carrier 46 comprises a cylindrical sleeve 48 which is seated on a can 50. The can 50 has an aperture 52 which corresponds to an inner space 54 of the cylindrical sleeve 48. The measuring section continuations 22a, 22b, 22c extend through this aperture 52. Furthermore, the can 50 has a peripheral collar 56 on its side facing away from the cylindrical sleeve 48. A cylindrical space 60 is defined between a floor 58 and the collar 56.

Arranged round the aperture 52 on the floor 58 distributed at an angle of 120° are markings 62 of a marking device for the measuring section holder 24. These markings 62 correspond to the positions of the measuring sections 20a, 20b, 20c and serve to simplify assembly.

The measuring section holder carrier 46 is fixed on a coil holder 64 (FIGS. 1, 2, 10) of the measuring head 16, as described in greater detail below. A tongue-and-groove arrangement for mutual rotational fixing is associated with the coil holder 64 and the measuring section holder carrier 46. For this purpose, for example, a groove 66 is arranged in the collar 56 of the measuring section holder carrier 46.

The coil holder 64 has a cylindrical form. Arranged therein are recesses 68a, 68b, 68c according to the number of measuring section continuations 22a, 22b, 22c. The first recess 68a is therein associated with the first measuring section continuation 22a, the second recess 68b is associated with the second measuring section continuation 22b and the third recess 68c is associated with the third measuring section continuation 22c. A respective recess 68a etc. therein has a first region 70 which extends from an end side 72 of the coil holder 64 which faces toward the measuring section holder carrier 46 as far as a middle region of the coil holder 64. A recess 68a etc. also has a second region 74 which extends from an end of the first region 70 to an end side 76 of the coil holder 64 which faces away from the measuring section holder 24.

Figure 10:
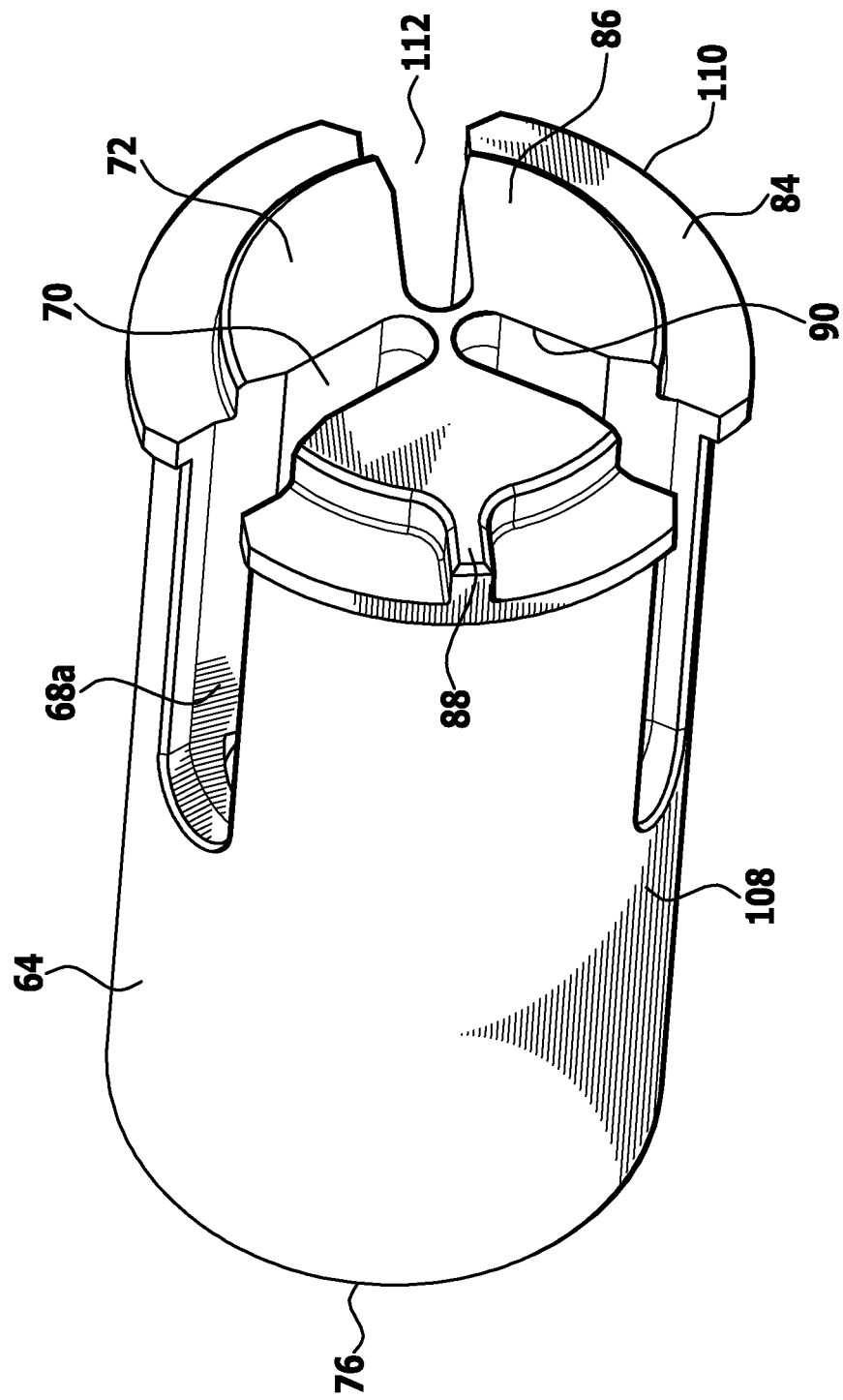
FIG. 10 shows a perspective view of an exemplary embodiment of a coil holder.

The second region 74 of the respective recess 68a etc. is configured, in particular, as a cylindrical bore in the coil holder 64. The first region 70 is configured as an indentation which is laterally open (FIG. 10). For lateral closing of the first region 70 of the recesses 68a etc., a bar device 78 with respective bars 80a, 80b, 80c is provided, wherein the bar 80a is associated with the first region 70 of the first recess 68a, the bar 80b is associated with the second recess 68b and the bar 80c is associated with the third recess 68c. The bars 80a, 80b, 80c of the bar device 78 are fixed at the first region 70 of the corresponding recess 68a, 68b, 68c, for example, by adhesion. Therein they leave a region free in which the corresponding measuring section continuation 22a, 22b, 22c is guided in the coil holder 64.

The measuring head 16 has an axis 82. This axis 82 is coaxial with the axis 26 of the measuring section holder 24. The measuring section holder 24 is seated centrally on the measuring head 16. The measuring head 16 has a larger diameter than the measuring section holder 24.

The second region 74 of the recess 68a etc. is offset parallel outwardly (away from the axis 82) and is thereby spaced from the axis 26. The aperture 52 lies coaxially with the axis 26 and thus also with the axis 82. The first region 70 provides a transition region between the aperture 52 and the offset parallel second region 74. The first region 70 is herein configured so that a continuous transition takes place.

The recesses 68a, 68b, 68c for the measuring section continuations 22a, 22b, 22c in the coil holder 64 have the same symmetry of the arrangement as the measuring sections 20a, 20b, 20c in the measuring section holder 24. In the exemplary embodiment shown, the recesses 68a, 68b, 68c are arranged rotationally symmetrical to the axis 82 and, in particular are arranged in a star form with an angular offset of 120°. The recesses 68a, 68b, 68c are aligned parallel to one another in their second region 74.

The coil holder 64 has at its end side 72 a recessed edge region 84 which is adapted to the collar 56 of the measuring section holder carrier 46. The recessed edge region 84 surrounds a projection 86 which is positioned in the space 60. The collar 56 surrounds this projection 86.

Arranged at the edge region 84 is a tongue 88 of the aforementioned tongue-and-groove arrangement. This tongue 88 penetrates into the groove 66 of the measuring section holder 46. By this means, a relative rotatability between the coil holder 64 and the measuring section holder carrier 46 is blocked. The tongue 88 and the groove 66 are herein arranged so that the markings 62 are aligned to entry apertures 90 of the recesses 68a, 68b, 68c.

Figure 11:
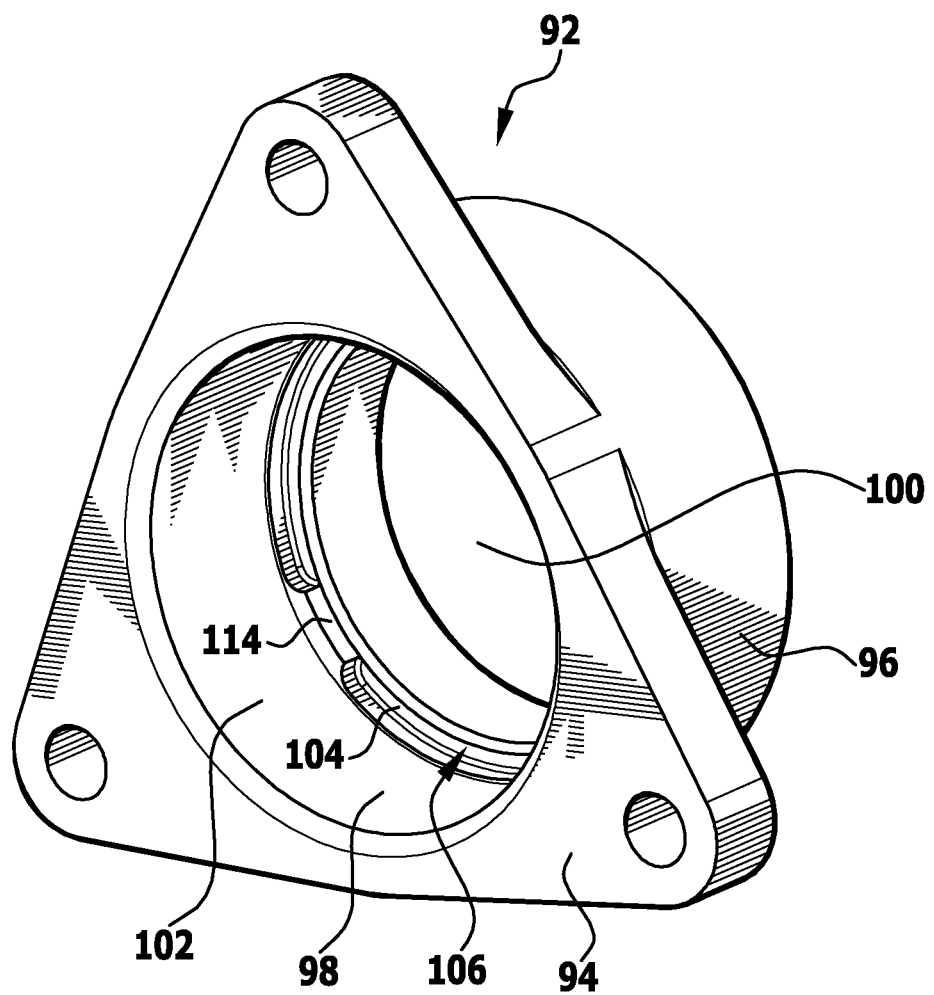
FIG. 11 shows a perspective view of an exemplary embodiment of a holder plate.

The measuring head 16 further comprises a holder plate 92 (FIGS. 1, 2, 11). This holder plate 92 is fixed on the coil holder 64. It has a, for example, triangular first region 94 (FIG. 11) on which a cylindrical flange 96 is seated. This flange 96 is placed on the coil holder 64. A part of the coil holder 64 with the end side 72 penetrates the flange 96. The flange 96 also surrounds the measuring section holder carrier 46.

The flange 96 and an aperture 98 in the first region 94 define an inner space 100 of the holder plate 92. The aforementioned part of the coil holder 64 and a subregion of the measuring section holder carrier 46 (specifically the can 50) is positioned in the inner space 100. The inner space 100 herein has a first subregion 102 and a second subregion 104. The subregion 102 is formed in the first region 94 and the second subregion 104 is formed in the flange 96. The second subregion 104 has a smaller diameter than the first subregion 102. Thereby an, in particular, annular contact surface 106 is formed.

The edge region 84 of the coil holder 64 protrudes outwardly beyond a cylindrical external contour 108 of the coil holder 64 (FIG. 10). An edge collar 110 is thereby formed. This edge collar abuts the contact surface 106. In the manufacturing of the displacement transducer 12, herein the coil holder 64 is pushed with its end side 76 first through the first subregion 102 of the inner space 100 until the edge collar 110 abuts the contact surface 106.

The edge collar 110 of the coil holder 64 has through openings 112 which correspond to the recesses 68a etc. These through openings form grooves of a tongue-and-groove arrangement for rotationally fixing the coil holder 64 relative to the holder plate 92. Corresponding tongues 114 are arranged on the contact surface 106. If a tongue 114 lies in a through hole 112 (groove), then the rotatability between the holder plate 92 and the coil holder 64 is blocked.

An axial fixing between the holder plate 92 and the coil holder 64 of the measuring head 16 takes place, for example, by adhesion. The fixing of the measuring head 16 is improved by means of the flange 96 configured, in particular, as a ring nut. Accordingly, an axial fixing can take place between the measuring section holder carrier 46 and the coil holder 64, also by means of adhesion.

In one embodiment, the flange 96 at least partially covers the bar device 78.

In one embodiment, through apertures 116 are arranged at the first region 94 of the holder plate 92. By this means, the displacement transducer 12 can be fixed, for example, at an application by means of screw fixings or the like.

The respective measuring sections 20a, 20b, 20c with their associated measuring section continuations 22a, 22b, 22c each comprise a wire waveguide 118. This wire waveguide 118 is the "actual" measuring section. It is laid to be continuous in the respective measuring section continuation 22a etc. and the measuring section 20a etc. It is fixed on a damping sleeve 134. This damping sleeve 134 is positioned close to one end 122 of the measuring section holder 24. The damping sleeve 134 is a metal element.

The wire waveguide 118 is surrounded by a hose 124. This hose 124 is made of an electrically insulating material and is, for example, a silicone hose. It serves, firstly, for electrical insulation of the wire waveguide 118 and, secondly, for supporting and positioning within the corresponding recesses 28a etc. and 68a etc.

A return conductor 126 is connected to the damping sleeve 134. This is soldered, for example, to the metal element 134 with a solder point 120. The return conductor 126 is fed through the recesses 28a etc. and 68a etc., wherein it lies outside the corresponding hose 124.

The hose 124 is constricted at spaced sites 128 (FIGS. 4 to 6, FIG. 8) and thereby the freedom of movement of the wire waveguide 118 is reduced. The constriction is not so narrow that the wave propagation is impeded. Thereby, a relative positional fixing of the wire waveguide 118 to the hose 124 is achieved. The relative positional fixing is a mounting with (defined, low) play. This, in turn, enables positional fixing of the wire waveguide 118 to the displacement transducer 12 when the hose 124 is laid into the recesses 28a etc. and 68a etc.

Arranged in the recesses 28a etc. of the measuring section holder 24 adjoining the metal element 120 are one or more damping masses 130, 132.

A corresponding damping mass 130, 132 surrounds the wire waveguide 118 in this region and provides for a damping of the corresponding mechanical wave.

Arranged between the damping mass 130 and the solder point 120 is the damping sleeve 134.

A measuring region 136 of the displacement transducer 12 lies substantially between one end of the damping mass 132 which the hose 124 abuts, and one end of the cylindrical sleeve 48. The spacing therebetween defines the length of the measuring region 136.

The wire waveguide 118 and correspondingly the return conductor 126 are guided through the corresponding recesses 68a etc. and also through the coil holder 64 (FIGS. 2 to 4). In the measuring section holder 24, the wire waveguides 118 of the corresponding measuring sections 20a, 20b, 20c are guided parallel to one another and parallel to the axis. Due to the passage through the first region 70 of the recesses 68a etc., a transversely offset arrangement comes about wherein in the second region 74, the wire waveguides 118 are guided parallel to the axis 26 again. The first region 70 is herein configured so that a mechanical wave can run through it without hindrance. In particular, for this purpose, the wire waveguide 118 is bent in this region, while avoiding corners. In particular, the wire waveguide is guided in the manner of an S-shape.

The bars 80a etc. of the bar device 78 and a floor 138 of the first region 70 of the recesses 68a etc. are correspondingly configured in order to enable an "edge-free" ("continuously differentiable") S-shaped guidance of the wire waveguide 118.

A sleeve 140 is arranged in the second region 74 of the respective recesses 68a etc. This sleeve 140 (FIG. 4) serves for fixing the positioning of the wire waveguide 118 in this second region 74 of the recess, and thus for S-shaped guidance. The sleeve 140 (spacing sleeve) is glued in, for example, in the corresponding second region 74 of the recesses 68a etc. It is surrounded by a screening tube 142. This screening tube 142 is made from a magnetically screening material.

A coil apparatus 144 is held on the coil holder 64. The coil apparatus 144 therein comprises (at least) one pick-up coil 146 which is arranged on a measuring section continuation 22a etc. in the second region 74 of the corresponding recess 68a etc. The corresponding pick-up coil 146 is adhered, in particular, into the sleeve 140.

The pick-up coil 146 is seated in the sleeve 140 with pins 150a, 150b, 150c, 150d made of metallic material. The return conductor 126 is wound round the pin 150a and is soldered thereto.

The wire waveguide 118 is wound round the pin 150d.

Seated on the pins 150a, 150b, 150c, 150d in each case is a band 152 with integrated conductors. Arranged on each band 152 is (at least) one resistor element 154. The resistor element of each band 152 is herein placed outside the coil holder 64. Herein, a respective band with its own resistor element 154 is associated with each measuring section 20a with its measuring section continuation 22a. Each band 152 is formed, in particular, as a flexible band. It guides the conductors and is also a carrier for the resistor element 154. By means of the resistor elements 154, the respective measuring sections 20a, 20b, 20c can be standardised in relation to one another and also to a subsequent circuit. In particular, imbalances in the electrical behaviour of the individual measuring sections 20a, 20b, 20c can be compensated. Due to the simple accessibility of the resistor elements 154, this compensation can be carried out easily.

Figure 15:
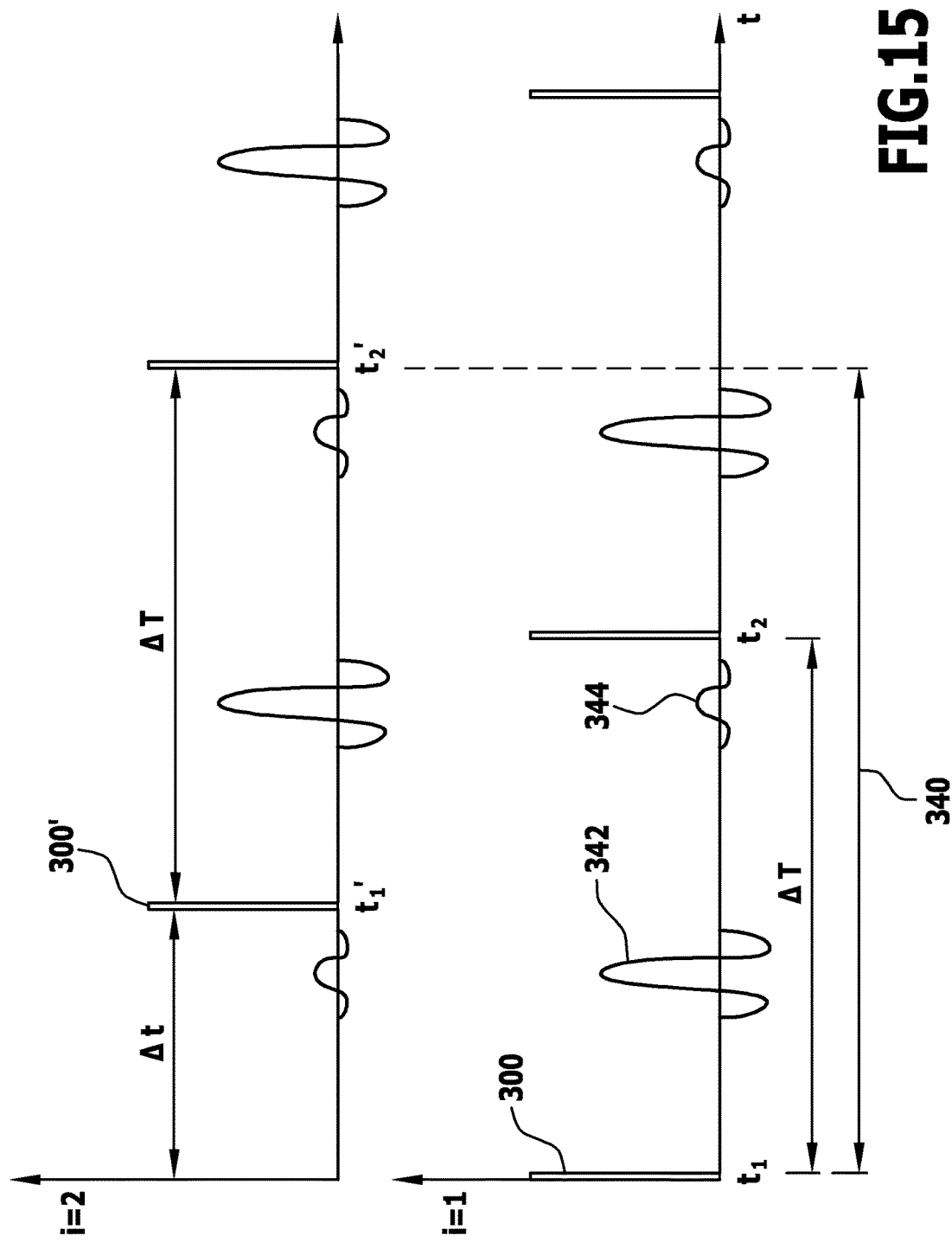
FIG. 15 shows schematically the sequence of mechanical waves (actual measuring waves for transit time determination and reflection wave) for different measuring sections and the temporal sequence of start signals.
Figure 16:
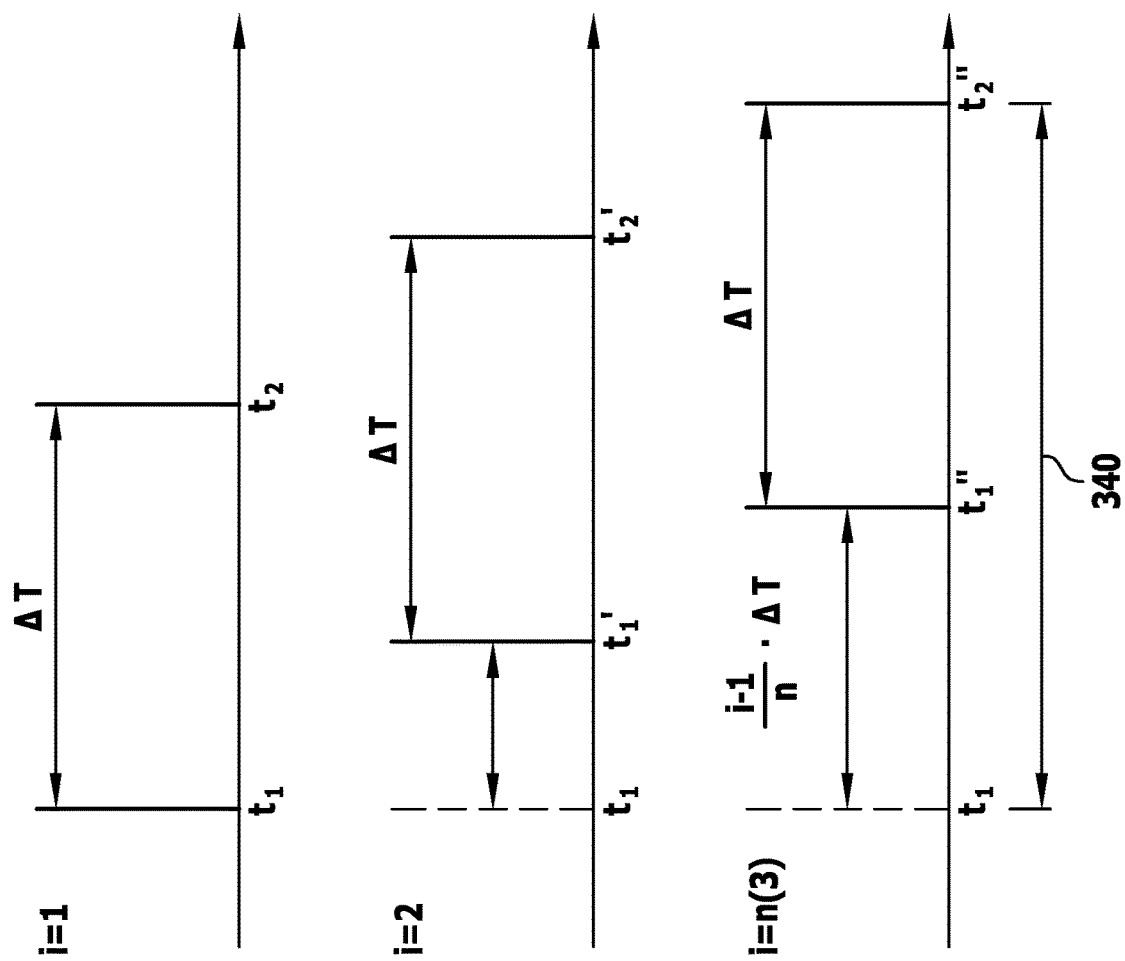
FIG. 16 shows schematically the temporal sequence of start signals for an exemplary embodiment with n=3 measuring sections.

The functioning of the path-measuring device 10 will now be described making reference to the schematic FIG. 12(a):

An excitation current pulse 156 originating from a measuring interface as the measurement signal, initiates a measurement. The excitation current pulse 156 is herein initiated by means of a start signal 300 (FIGS. 15, 16). The excitation current pulse 156 generates a circular magnetic field 158 which, due to soft magnetic properties of the waveguide (wire waveguide) 118 becomes concentrated therein. The position indicator 14 (in particular, permanent magnet) is positioned at a measuring site 160 of the waveguide 118. The magnetic field lines 162 of said position indicator extend perpendicularly to the circular magnetic field 158 and are also concentrated in the waveguide 118.

In one region in which the circular magnetic field 158 and the magnetic field generated by the position indicator 14 overlap, an elastic deformation takes place in the microregion of the structure of the waveguide 118 due to magnetostriction. This elastic deformation itself brings about a mechanical wave (elastic wave) propagating along the waveguide 118 in the opposite direction 164, 166. The propagation velocity of this wave in the waveguide 118 is in the order, in particular, of approximately 2800 m/s and is largely insensitive to environmental influences.

The damping masses 130, 132 are arranged at the end 122 of the corresponding measuring section. By means of these, the transsonic waves running to the end 122 are damped so that an amplitude of the reflected portion of the wave is smaller during signal detection, compared with the amplitude of the directly propagated wave.

At the other end 168, the corresponding pick-up coil 146 is arranged which, by reversal of the magnetostrictive effect and the magnetic induction, generates an electrical signal and supplies it to the measuring interface.

The wave transit time from the site of origin to the pick-up coil 146 is directly proportional to the spacing between the position indicator 14 and the pick-up coil 146. By means of a time measurement, therefore, the spacing between the pick-up coil 146 and the position indicator 14 can be determined with great accuracy. The primary measurement signal for the time measurement is the electrical signal of the pick-up coil 146 which is supplied from the pick-up coil 146 to the measuring interface temporally offset from the start signal dependent upon the spacing between the pick-up coil 146 and the position indicator 14.

It is inherent that an excitation current pulse which is sent along a measuring section (for example, the measuring section 20*a*) can induce voltages in the other measuring sections 20*b*, 20*c*, most particularly on switching off. Therefore a cross-talk can in principle take place.

Figure 12B:
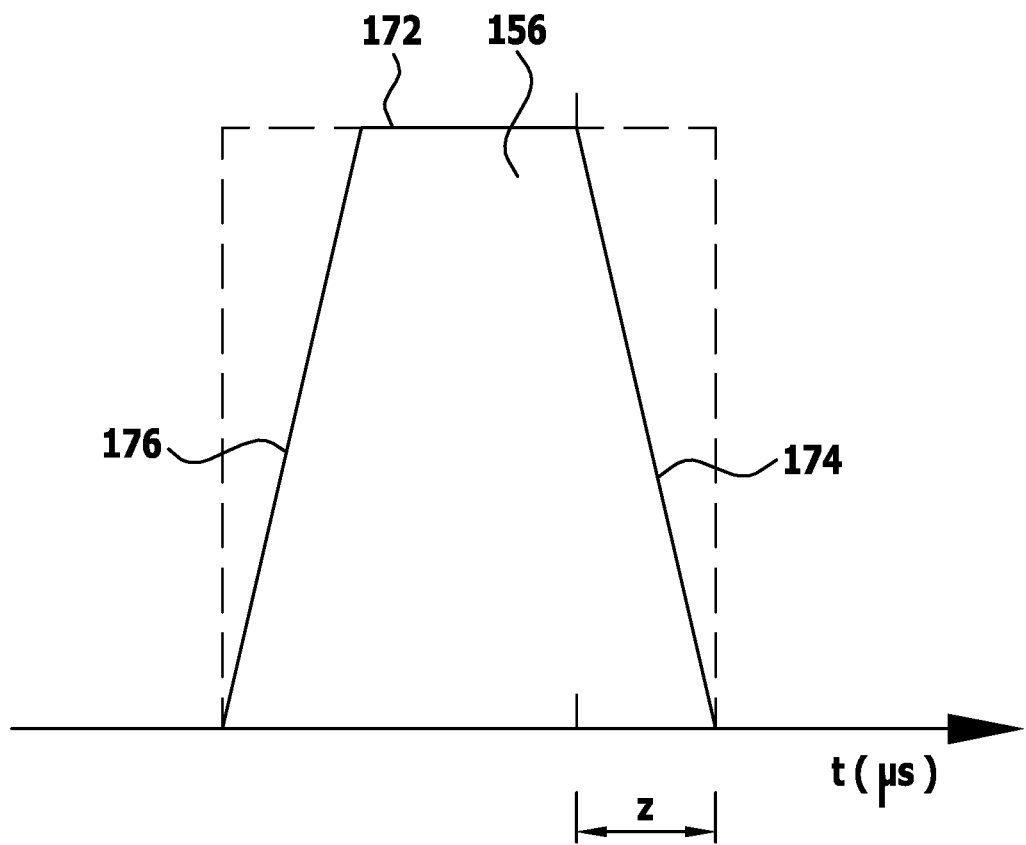
FIG. 12(b) shows a schematic representation of a current pulse.

An induction voltage limiting device 170 is provided which sets a flank steepness 172 (FIG. 12(*b*)) of an excitation current pulse 156, in particular on switching off, such that in particular a fall from a maximum amplitude 174 to zero takes place in a period of at least 1.5 µs and, in particular, in a period of at least 2 µs, and in particular, in a period of at least 3 µs.

By means of the setting of a corresponding flank steepness, the size of induced voltages is reduced.

It is therein also possible that there is set a corresponding finite flank steepness 176 upon switching on. The induction voltage limiting device 170 is realized, for example, by means of an RCD member.

In one embodiment, a magnetic device 178 is integrated into the coil holder 64 (FIG. 2). The magnetic device 178 is realized, for example, by means of magnets which are integrated into the corresponding bars 80*a*, 80*b*, 80*c*. The magnetic device 178 is a bias magnetic device which serves to reduce the cross-talk between measuring sections 20*a*, 20*b*, 20*c*, and/or measuring section continuations 22*a*, 22*b*, 22*c*. Thereby, the influence of the current pulse on one measuring section on the pick-up coil associated with another measuring section can be reduced.

The bars 80*a* etc. can be, for example, plastics covered magnets. The orientation and strength of the magnetic field can be set specifically.

It is provided that current-carrying conductors are laid exactly parallel. Thereby, interfering fields which can arise with a crossed construction are prevented.

In the measuring head 16, the cross-talk due to an increased spacing of the pick-up coils 146 is reduced through the offset arrangement relative to the axis 26.

In a variant of one embodiment, one or more conductors 180 (FIG. 5) are additionally arranged in the measuring section holder 24 and the coil holder 64. A conductor 180 is laid, for example, parallel. A meandering arrangement or the like is also possible. By means of one or more current-carrying conductors 180, with suitable routing of the conductor 180 and setting of the current strength, a possible cross-talk between different measuring sections 20*a*, 20*b*, 20*c* can be compensated for.

The temporal spacing between the emission of the start signal and the arrival of the electrical signal of the pick-up coil 146 is determined. From the known wave velocity on a corresponding measuring section 20*a*, 20*b*, 20*c*, the distance covered by the mechanical wave is then determined. By this means, again, the location of the position indicator 14 at the corresponding measuring section 20*a*, 20*b*, 20*c* is known.

Figure 13:
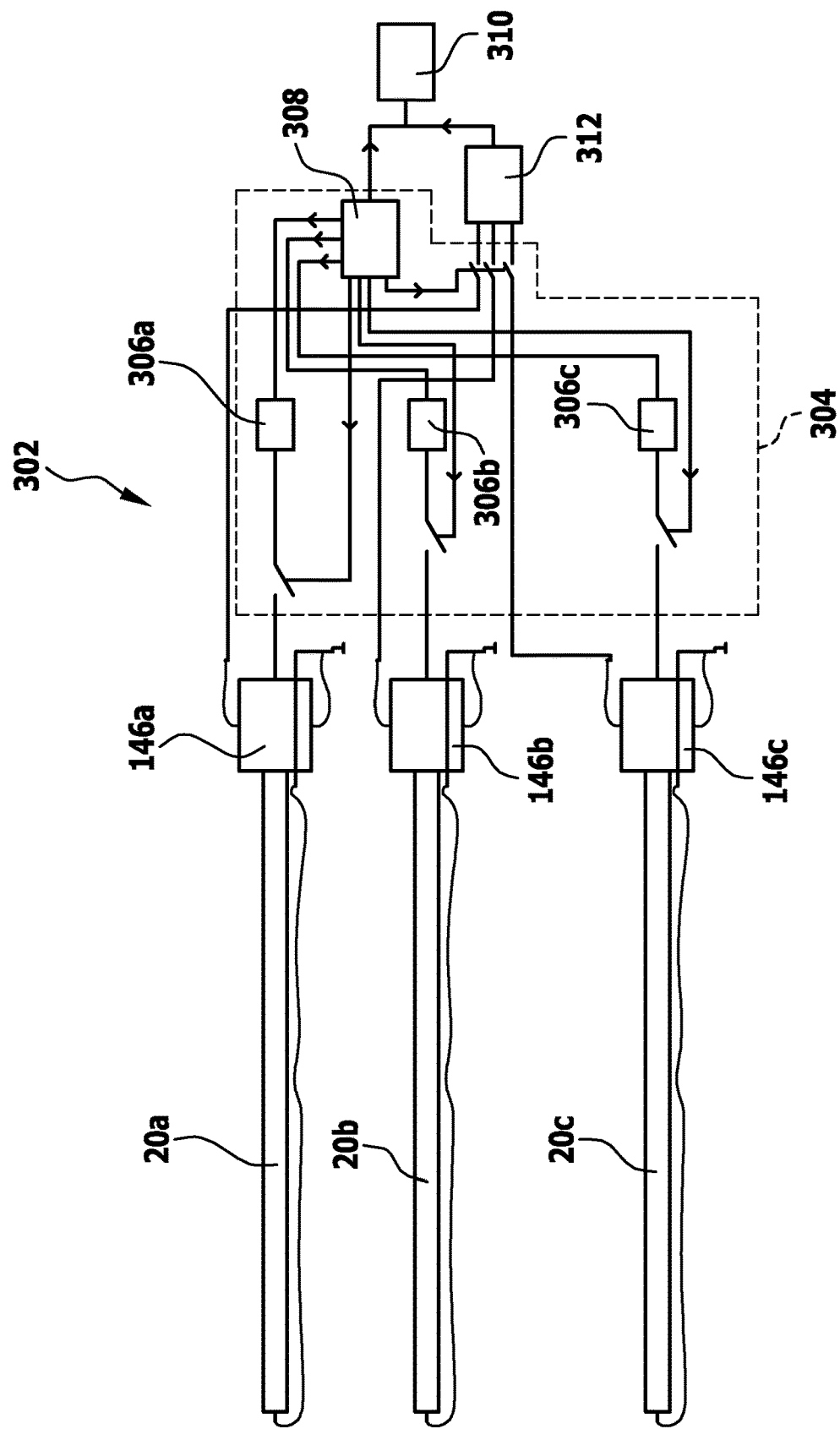
FIG. 13 shows a schematic representation of an exemplary embodiment of a path-measuring device with a measuring interface.

A first embodiment of a measuring interface 302 (FIG. 13) comprises a start signal application device 304. By means of the start signal application device, start signals are providable to the individual measuring sections 20*a*, 20*b*, 20*c*.

In the measuring interface 302, the start signal application device comprises start signal generators 306*a*, 306*b*, 306*c*, wherein a dedicated start signal generator 306*a*, 306*b*, 306*c* is associated with each measuring section 20*a*, 20*b*, 20*c*. The start signal generator 306*a* etc. associated with the respective measuring section 20*a* etc. provides start signals 300 to its measuring section 20*a* etc.

The start signal application device 304 further comprises a time control device 308. The time control device 308 provides that the start signal application to the respective measuring sections 20*a* etc. takes place in a temporally defined manner, as described in greater detail below. Firstly, on the individual measuring sections, clock cycling of start signals 300 takes place in measuring cycles. Secondly, a temporally controlled application of start signals takes place for different measuring sections 20*a*, 20*b*, 20*c* within a measuring cycle, as described in greater detail below.

The time control device 308 is realized, for example, by means of a microprocessor.

The measuring interface 302 further comprises an evaluating device 310 which is realized, for example, by means of an ASIC. The evaluating device 310 receives the signals provided by the individual measuring sections 20*a*, 20*b* and 20*c* (and therein by the respective pick-up coils 146*a*, 146*b*, 146*c*).

Herein, a converter 312 which creates analogue signals from the signals provided can be connected upstream of the evaluating device 310.

The time control device 308 is coupled with regard to signals to the evaluating device 310 and the converter 312. By this means, it can be detected by the evaluating device 310 by which respective measuring section 20*a*, 20*b*, 20*c* a signal provided was generated.

Figure 14:
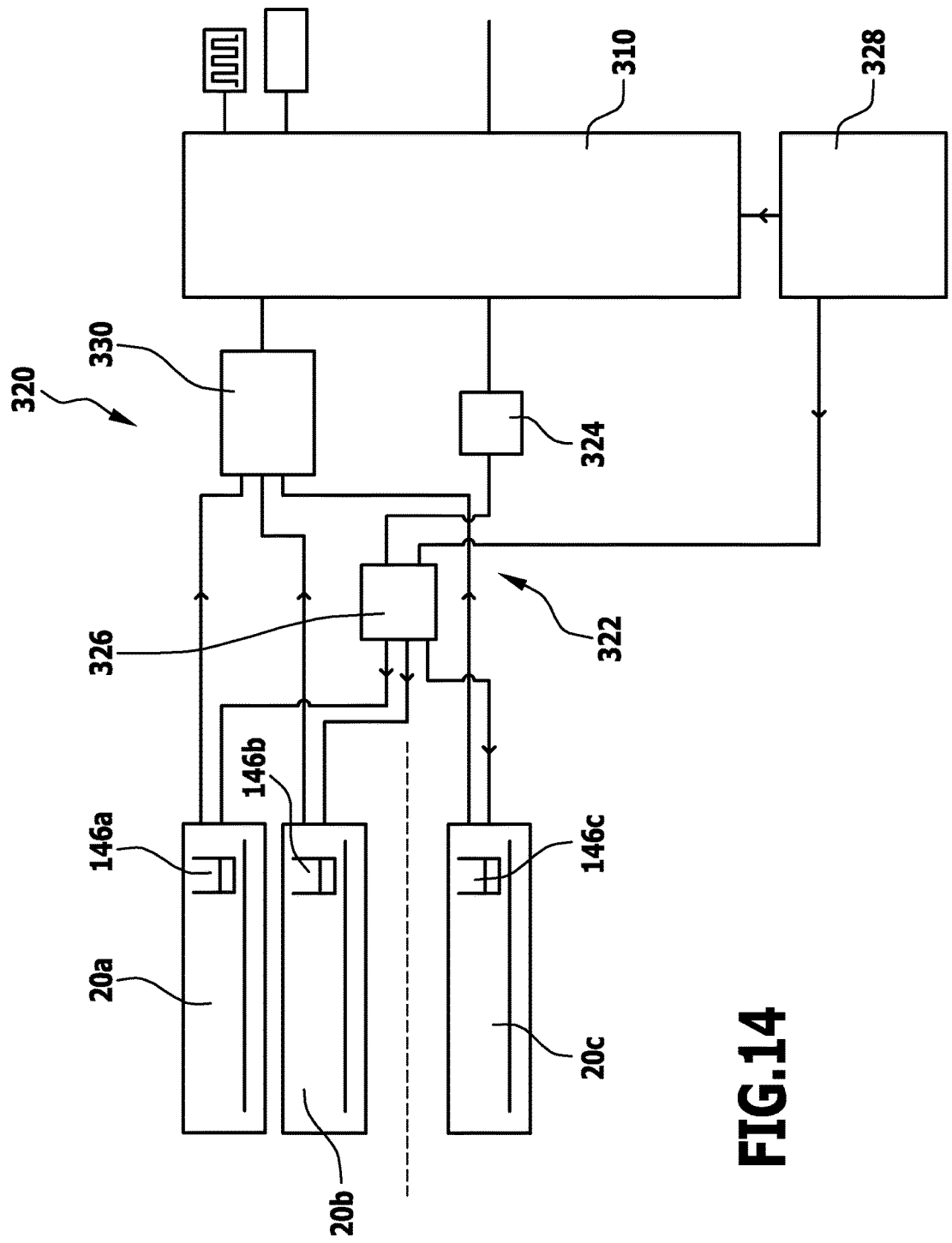
FIG. 14 shows a further exemplary embodiment of a path-measuring device with a measuring interface.

In a further exemplary embodiment of a measuring interface which is shown schematically in FIG. 14 and is identified there as 320, a start signal application device 322 is provided. The start signal application device 322 comprises a start signal generator 324 which is associated with a plurality of measuring sections 20*a* etc. and, in particular, is associated with all the measuring sections 20*a*, 20*b*, 20*c*. The start signal generator 324 is then a common start signal generator for the measuring sections 20*a* etc. which generates all the primary start signals for all the measuring sections 20*a* etc.

A multiplexer 326 is connected downstream of the start signal generator 324. The multiplexer 326 is controlled by a time control device 328. By means of the multiplexer 326, temporally controlled start signals 300 can be provided to the different measuring sections 20*a* etc., wherein as aforementioned, the temporal control also enables a temporal offset of the start signals 300 for different measuring sections 20a etc. within a measuring cycle.

Furthermore, an evaluating device is provided corresponding to the evaluating device 310. As with the measuring interface 320, the time control device 328 is coupled to the evaluating device 310.

Furthermore, a converter 330 is provided which converts signals from the corresponding pick-up coils 146a etc. into analogue signals. The converter 330 herein comprises a multiplexer. Corresponding signals are then provided to the evaluating device 310 wherein, via the multiplexer by means of the evaluating device 310, the signals provided can be associated with the individual measuring sections 20a etc.

The path-measuring device with the measuring interface 302 or the measuring interface 320 functions as follows:

The position indicator 14 couples to all the measuring sections 20a, 20b, 20c in the same way. According to the invention, start signals 300 are not issued simultaneously to the different measuring sections 20a etc., but at a temporal spacing (FIGS. 15 and 16).

For example, within one measuring cycle 340 at a first time point $t_1$, a start signal 300 is issued to the first measuring section 20a. By this means, a corresponding excitation current pulse 156 is generated, which in turn leads to the formation of a mechanical wave 342. The mechanical wave 342 is herein that wave which is used for the evaluation, and the transit time of which on the corresponding first measuring section 20a (measuring section i, where i=1) is determined.

By means of the reflection at the end 122, a reflection wave 344 arises which also reaches the associated pick-up coil. The reflection wave 344 has a smaller amplitude than the mechanical wave 342. However, it can, in principle, trigger signals.

At a second time point $t_2$ which lies at a temporal interval ΔT (first time interval) from the first time point $t_1$, a further start signal 300 is then provided to the first measuring section 20a.

At a time point $t_1$', a start signal 300' is provided to a second measuring section 20b (measuring section i, where i=2), which triggers a corresponding excitation current pulse 156 on this second measuring section 20b. On the second measuring section 20b in turn, there arises a mechanical wave corresponding to the wave 342 and one (or more) reflection waves corresponding to the reflection wave 344.

If the first measuring section 20a and the second measuring section 20b are configured identical, the position indicator 14 couples at these measuring sections 20a, 20b in the same way and, in the relevant timespan, the position indicator 14 has not been substantially moved, the mechanical waves 342 on the measuring sections 20a, 20b and the reflection waves 344 should be formed at least approximately the same.

Then, at a time point $t_2$', a further start pulse is provided to the second measuring section 20b. The provision of this start pulse at the time point $t_2$' represents the end of the measuring cycle 340 when the corresponding path-measuring system has only two measuring sections as shown in FIG. 15.

FIG. 16 shows an exemplary embodiment with three measuring sections.

The time point $t_1$' for the start signal 300' to the second measuring section 20b does not coincide with the first time point $t_1$ for the start signal for the first measuring section 20a. Between the first time point $t_1$ and the second time point $t_2$ or $t_1$' and $t_2$', there is a first time interval ΔT. Between the time point $t_1$ and the time point $t_1$' lies a second time interval Δt which is finite but smaller than the first time interval ΔT.

For example, the time interval Δt for the measuring section having the number i among n measuring sections, wherein n is an integer and i lies between 1 and n is $$\Delta t = \frac{i-1}{n} \cdot \Delta T \quad (1)$$

In the exemplary case of FIG. 15 wherein n=2, the second time interval is Δt=ΔT/2.

The first time interval ΔT is selected so that it corresponds at least to a maximum transit time of the mechanical wave 342 on the corresponding measuring section 20a, 20b. The maximum transit time is herein given by that measuring length at which the position indicator 14 is maximally spaced within the measuring region from the corresponding pick-up coil 146a etc.

In an exemplary embodiment, the first time interval ΔT corresponds simply to the maximum transit time, that is, simply to once the maximum transit time.

On the individual measuring sections 20a, 20b, therefore, following the start signal application, there is a wait of a single maximum transit time. By this means, it is ensured that reflections (the reflection wave 344 and further reflections) have largely decayed when on the same measuring section 20a or 20b a further measurement is initiated by a further start signal (at the time point $t_2$ or $t_2$').

Relative to the overall system, however, in one measuring cycle 340, with two measuring sections, there results an effective clocking (sampling) rate that is twice as fast, also through the use of two measuring sections with the temporal control of the start signal application over the second temporal spacing Δt.

Thereby, for example, at the same signal quality, a more rapid cycling is possible. A dead time is thereby reduced.

It is also possible, for example, that for the first time interval ΔT, a single maximum transit time is not used, but for example, a double maximum transit time. By this means, it is ensured that on a single measuring section 20a etc., no reflections are still in progress when a new start signal is provided. An improved signal quality is thereby obtained. With an equally fast clocking rate, a better signal quality can thereby be realized since the measuring sections effectively become "quieter".

Thereby again, it is also possible, in particular if twice the maximum transit time is used for the second time interval, at the same clocking rate and the same signal quality, to shorten dead zones. For example, a dead zone at the respective end 122 of the measuring sections 20a, 20b etc. can be shortened since the damping can be shortened and a good signal quality is nevertheless achieved. This also enables the measuring sections to be constructed shorter for an identical measuring region.

The measuring cycle 340 has a length which corresponds to the spacing between the time point $t_2$' and the first time point $t_1$.

It is herein possible that measuring cycles 340 are interleaved with one another (see FIG. 15). At the time point $t_2$, a new measuring cycle 340 is already beginning for the first measuring section 20a, wherein between the time points $t_2$ and $t_2$', the preceding measuring cycle is not yet complete. It is complete at the time point $t_2$'.

In principle, the first time interval ΔT can be fixedly set. For example, it is firmly specified on the basis of the maximum measuring length and the wave velocity. Depending on the case of use, for example, a single maximum transit time or twice the maximum transit time is specified.

It is in principle also possible that the first time interval $\Delta T$ is set variably. For example, it is determined by means of the evaluating device 310 whether reflections have reached a particular level (a particular lower amplitude threshold) and then a corresponding start signal 300 is provided on the corresponding measuring section i. In this case, the time control is adapted variably. Thereby, it is for example possible to minimize dead times by minimizing "safety spacings".

FIG. 16 shows schematically a sequence diagram for three measuring sections i=1, 2, 3 where n=3. The measuring sections are, in particular, the measuring sections 20a, 20b and 20c.

For the measuring section i=1, at the first time point $t_1$, a start signal is provided. Following the first time interval $\Delta T$, at the second time point $t_2$, a further start signal is provided.

To the measuring section i=2, following the first time point, a start signal is provided at the time point $t_1'$. A further start signal is provided at the time point $t_2'=t_1'+\Delta T$.

A temporal spacing between the time point $t_1'$ and $t_1$ is determined according to formula (1) for i=2.

Accordingly, a start signal is provided to the third measuring section at a time point $t_1''$ and then again at the time point $t_2'=t_1''+\Delta T$. A temporal spacing between the time point $t_1''$ and the time point $t_1$ is determined according to formula (1) for i=3.

The measuring cycle 340 has a timespan between the first time point $t_1$ and the time point $t_2''$.

In the inventive solution, by means of the time control device 308 or 328, the start signal application to the measuring sections 20a, 20b, 20c is time controlled for a plurality of measuring sections. With suitable time control, for example, an n-times faster effective clocking rate can be achieved with n measuring sections for the overall system as compared with single clocking of an individual measuring section. According to use, with the same signal quality, faster clock cycling times can be achieved. With equally fast clocking rates (for example as compared with the case in which start signals are issued simultaneously to the measuring sections), a better signal is obtained or with the same signal quality, dead zones can be reduced.

The signal-to-noise ratio is not impaired by, for example, a faster clocking rate in relation to the overall system.

LIST OF REFERENCE DESIGNATIONS

10 Path-measuring device
12 Displacement transducer
14 Position indicator
16 Measuring head
18 Travel path device
20a First measuring section
20b Second measuring section
20c Third measuring section
22a First measuring section continuation
22b Second measuring section continuation
22c Third measuring section continuation
24 Measuring section holder
26 Longitudinal direction
28a First recess
28b Second recess
28c Third recess
30 T-shaped elements
32 Angle
34 Wall
36 First region
38 Planar side
40 Transition region
42 Second region
44 Central region
45 Aperture
46 Measuring section holder carrier
48 Cylindrical sleeve
50 Can
52 Aperture
54 Inner space
56 Collar
58 Floor
60 Space
62 Marking
64 Coil holder
66 Groove
68a First recess
68b Second recess
68c Third recess
70 First region
72 End side
74 Second region
76 End side
78 Bar device
80a Bar
80b Bar
80c Bar
82 Axis
84 Edge region
86 Projection
88 Tongue
90 Entry aperture
92 Holder plate
94 First region
96 Flange
98 Aperture
100 Inner space
102 First subregion
104 Second subregion
106 Contact surface
108 Cylindrical external contour
110 Edge collar
112 Through opening
114 Tongue
116 Aperture
118 Wire waveguide
120 Solder point
122 End
124 Hose
126 Return conductor
128 Site
130 Damping mass
132 Damping mass
134 Damping sleeve
136 Measuring region
138 Floor
140 Sleeve
142 Screening tube
144 Coil apparatus
146 Pick-up coil
146a Pick-up coil
146b Pick-up coil
146c Pick-up coil
150a Pin
150b Pin 150c Pin
150d Pin
152 Band
154 Resistor element
156 Excitation current pulse
158 Magnetic field
160 Measuring site
162 Magnetic field lines
164 Direction
166 Direction
168 End
170 Induction voltage limiting device
172 Flank steepness
174 Maximum amplitude
176 Flank steepness
178 Magnetic device
180 Conductor
300 Start signal
300' Start signal
302 Measuring interface
304 Start signal application device
306a Start signal generator
306b Start signal generator
306c Start signal generator
308 Time control device
310 Evaluating device
312 Converter
320 Measuring interface
322 Start signal application device
324 Start signal generator
326 Multiplexer
328 Time control device
330 Converter
340 Measuring cycle
342 Mechanical wave
344 Reflection wave
$t_1$ First time point
$t_1'$ First time point
$t_1''$ First time point
$t_2$ Second time point
$t_2'$ Second time point
$t_2''$ Second time point
$\Delta T$ First time interval
$\Delta t$ Second time interval

What is claimed is:

1. Magnetostrictive path-measuring device, comprising:
a plurality of measuring sections, each having an extent in a longitudinal direction and being arranged parallel to one another at least in a measuring region,
at least one magnetic position indicator which is coupled contactlessly to the measuring sections,
a start signal application device by means of which start signals are provided to the measuring sections for the generation of excitation current pulses, and
an evaluating device by means of which a position of the position indicator on the measuring sections is determined by a transit time measurement of mechanical waves,
wherein the start signal application device comprises a time control device which directs that in a measuring cycle, start signals are provided to different measuring sections at defined different time points.

2. Magnetostrictive path-measuring device according to claim 1, wherein the time control device directs that in the measuring cycle, a start signal is provided to a first measuring section at a first time point and at a second time point which lies at a first time interval $\Delta T$ from the first time point, a start signal is provided, and a respective start signal is provided to a further measuring section between the first time point and the second time point.

3. Magnetostrictive path-measuring device according to claim 2, wherein with n measuring sections, where n is an integer, the time control device directs that in the measuring cycle a start signal is provided to the measuring section i, where i=2, . . . , n at a second time interval $(i-1)/n \cdot \Delta T$ relative to the first time point.

4. Magnetostrictive path-measuring device according to claim 2, wherein start signals are provided to each measuring section respectively at the first time interval $\Delta T$.

5. Magnetostrictive path-measuring device according to claim 2, wherein the first time interval $\Delta T$ is equal to or greater than a maximum transit time of a mechanical wave on the measuring section.

6. Magnetostrictive path-measuring device according to claim 2, wherein the first time interval $\Delta T$ is equal to or greater than twice a maximum transit time of a mechanical wave on the measuring section.

7. Magnetostrictive path-measuring device according to claim 2, wherein time intervals at which start signals are provided to the measuring sections in the measuring cycle are fixedly set.

8. Magnetostrictive path-measuring device according to claim 2, wherein time intervals at which start signals are provided to the measuring sections in the measuring cycle are determined by detecting reflections of the mechanical wave.

9. Magnetostrictive path-measuring device according to claim 2, wherein the measuring cycle begins with the first time point and ends with the time point which has the first time interval $\Delta T$ from that time point at which of all the measuring sections the temporally last start signal is provided to a corresponding measuring section between the first time point and the second time point.

10. Magnetostrictive path-measuring device according to claim 1, wherein the measuring sections are identically constructed.

11. Magnetostrictive path-measuring device according to claim 1, wherein a dedicated start signal generator of the start signal application device is associated with each measuring section.

12. Magnetostrictive path-measuring device according to claim 1, wherein associated with a plurality of measuring sections is a common start signal generator, to which a multiplexer is connected downstream, wherein the multiplexer provides start signals to the respective measuring sections.

13. Magnetostrictive path-measuring device according to claim 1, wherein the time control device is coupled to the evaluating device.

14. Magnetostrictive path-measuring device according to claim 1, wherein there is associated with the evaluating device a multiplexer, by means of which signals which are provided by the measuring sections are provided to the evaluating device.

15. Method for operating a magnetostrictive path-measuring device, wherein the path-measuring device comprises:
a plurality of measuring sections, each having an extent in a longitudinal direction and being arranged parallel to one another at least in a measuring region, and
a magnetic position indicator which is coupled contactlessly to the measuring sections, comprising:
providing start signals to the measuring sections, initiating excitation current pulses on the measuring sections and determining a transit time of mechanical waves on the measuring sections, wherein in a measuring cycle, start signals are provided to different measuring sections at different times.

16. Method according to claim 15, wherein in the measuring cycle, a start signal is provided to a first measuring section at a first time point and at a second time point which lies at a first time interval $\Delta T$ from the first time point, a start signal is provided and a respective start signal is provided to a further measuring section between the first time point and the second time point.

17. Method according to claim 16, wherein with n measuring sections, where n is an integer, in the measuring cycle a start signal is provided to the measuring section i, where i=2, . . . , n at a second time interval $(i-1)/n \cdot \Delta T$ relative to the first time point.

18. Method according to claim 16, wherein start signals are provided to each measuring section respectively at the first time interval $\Delta T$.

19. Method according to claim , wherein the first time interval $\Delta T$ is equal to or greater than a maximum transit time of a mechanical wave on the measuring section.

20. Method according to claim 16, wherein the first time interval $\Delta T$ is equal to or greater than twice a maximum transit time of a mechanical wave on the measuring section.

21. Method according to claim 16, wherein time intervals at which start signals are provided to the measuring sections in the measuring cycle are fixedly set and, in particular, are established dependent upon a measuring length and a propagation velocity of the mechanical wave.

22. Method according to claim 16, wherein time intervals at which start signals are provided to the measuring sections in the measuring cycle are determined by detecting reflections of the mechanical wave.

23. Method according to claim 16, wherein the measuring cycle begins with the first time point and ends with the time point which has the first time interval $\Delta T$ from that time point at which of all the measuring sections the temporally last start signal is provided to a corresponding measuring section between the first time point and the second time point.

24. Method according to claim 16, wherein an effective clocking rate of the path-measuring system according to one measuring cycle is faster than a clocking rate on the measuring sections.

* * * * *

UNITED STATES PATENT AND TRADEMARK OFFICE
CERTIFICATE OF CORRECTION

PATENT NO. : 10,352,735 B2
APPLICATION NO. : 15/695076
DATED : July 16, 2019
INVENTOR(S) : T. Beutler Page 1 of 1

It is certified that error appears in the above-identified patent and that said Letters Patent is hereby corrected as shown below:

In the Claims

Column 19, Line 21: "19. Method according to claim , wherein the first time" should read
-- 19. Method according to claim 16, wherein the first time --

Signed and Sealed this
Third Day of September, 2019

Andrei Iancu
*Director of the United States Patent and Trademark Office*